US012754518B2

(12) United States Patent
Russell et al.

(10) Patent No.: US 12,754,518 B2
(45) Date of Patent: Oct. 6, 2026

(54) ISOLATION OF WATCH HOUSING AND ANTENNA USING A MOLDED COVER

(71) Applicant: Garmin International, Inc., Olathe, KS (US)

(72) Inventors: Matthew L. Russell, Olathe, KS (US); Seth R. Powers, Olathe, KS (US); Jia-Lin Wu, New Taipei City (TW); Wen-Tsung Huang, New Taipei City (TW); Dustin L. Kelsey, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 316 days.

(21) Appl. No.: 18/665,959

(22) Filed: May 16, 2024

(65) Prior Publication Data

US 2025/0076825 A1 Mar. 6, 2025

Related U.S. Application Data

(60) Provisional application No. 63/579,661, filed on Aug. 30, 2023.

(51) Int. Cl.

*G04R 60/08* (2013.01)
*H01Q 1/27* (2006.01)

(Continued)

(52) U.S. Cl.

CPC ............... *G04R 60/08* (2013.01); *H01Q 9/04* (2013.01); *H01Q 21/28* (2013.01); *H01Q 1/273* (2013.01)

(58) Field of Classification Search

CPC .......... G04R 60/08; G04R 60/12; H01Q 9/04; H01Q 21/28; H01Q 1/273; H01Q 13/10

See application file for complete search history.

(56) References Cited

U.S. PATENT DOCUMENTS 9,768,495 B2 * 9/2017 Standke ................. H01Q 1/273
10,276,925 B2 * 4/2019 Han ..................... H01Q 9/0414

(Continued)

OTHER PUBLICATIONS

Printout from https://gshock.casio.com/sg/g-news/new-releases/2023/gwg-2000cr/ published prior to May 16, 2024.

(Continued)

*Primary Examiner* — Dimary S Lopez Cruz
*Assistant Examiner* — Austin M Back
(74) *Attorney, Agent, or Firm* — Samuel M. Korte; Kathleen D. Fitterling

(57) ABSTRACT

A wrist-worn electronic device comprises a lower housing, an upper housing, an electrically non-conductive element, a first antenna and a location determining element. The lower housing includes a molded cover and an outer portion. The molded cover includes a first portion composed of an electrically conductive material, a second portion composed of an electrically non-conductive material and a surface having two electrical ground locations. The upper housing opposes the molded cover, includes a bezel formed of an electrically conductive material and has two electrical ground locations electrically coupled to the two electrical ground locations on the surface of the molded cover. The second portion of the molded cover substantially electrically shields the first antenna from the outer portion of the lower housing. The outer portion of the lower housing may be composed of a non-homogenous material, such as carbon fiber, or a homogenous material, such as titanium.

20 Claims, 12 Drawing Sheets

(51) Int. Cl.
*H01Q 9/04* (2006.01)
*H01Q 21/28* (2006.01)

(56) References Cited

U.S. PATENT DOCUMENTS 10,484,958 B2 * 11/2019 Sayem ................. H05K 7/1427
2019/0245271 A1 * 8/2019 Varjonen .................. H01Q 1/42

OTHER PUBLICATIONS

Printout from https://hiconsumption.com/watches/best-carbon-fiber-watches/ published prior to May 16, 2024.
Printout from https://www.crownwatchblog.com/how-it-works/a-guide-to-carbon-composite-in-watches published prior to May 16, 2024.
Printout from https://www.exquisitetimepieces.com/blog/best-carbon-fiber-watches/ published prior to May 16, 2024.
Printout from https://www.thewatchcompany.com/blog/recommended/best-carbon-fiber-watches-to-buy/ published prior to May 16, 2024.

* cited by examiner

ISOLATION OF WATCH HOUSING AND ANTENNA USING A MOLDED COVER

CROSS-REFERENCE TO RELATED APPLICATIONS

The current patent application is a non-provisional utility patent application which claims priority benefit, with regard to all common subject matter, of earlier-filed U.S. Provisional Application Ser. No. 63/579,661, filed Aug. 30, 2023, and entitled "ISOLATION OF WATCH HOUSING AND ANTENNA USING A MOLDED COVER." The Provisional application is hereby incorporated by reference, in its entirety, into the current patent application.

BACKGROUND OF THE INVENTION

Conventional wrist-worn electronic devices often include functionality that may be used to track users' current locations, distances traveled, velocities, and other performance metrics or data. This functionality may be provided by receiving positional information from a satellite-based positioning system such as the global navigation satellite system (GNSS). In addition, such devices may communicate wirelessly with other electronic devices, systems, or networks to monitor a user's activities, running or biking performance, upload and download data, receive messages and information, and so forth. The communication protocols utilized to transmit and receive information may include Bluetooth, Wi-Fi, or telecommunication, such as cellular, signaling protocols. The electronic device may include two or more antennas that are utilized to receive signals from GNSS satellites and wirelessly communicate with other electronic devices or telecommunication services.

Conventional wrist-worn electronic devices include a housing assembly that includes an upper housing and a lower housing. The upper housing generally includes a bezel and the lower housing generally includes a bottom wall, such as a base plate. One or more sidewalls and lugs for attaching a wrist-band or strap to the housing assembly may each be part of the upper housing, the lower housing or a combination thereof. Portions of the housing assembly may be composed of an electrically conductive material to partially form one or more antennas that may be utilized to transmit and receive communication signals and/or receive location signals. For example, a conventional wrist-worn electronic device may incorporate a slot antenna formed within a portion of the housing composed of electrically non-conductive material. More particularly, the housing assembly may be formed by an upper housing and a lower housing. An upper portion of the lower housing may be composed of the electrically conductive material to form a lower portion of the slot antenna, a lower portion of the upper housing may be composed of the electrically conductive material to form an upper portion of the slot antenna, and two elements formed of electrically conductive material that extend vertically between the lower housing and the upper housing forming two side portions of the slot antenna. The slot antenna may be electrically coupled with a circuit board positioned within an inner cavity formed by the housing assembly that at least partially provides a ground plane for the slot antenna. For certain conventional wrist-worn electronic devices, an electrically non-conductive spacer (e.g., an annular ring formed of plastic) may separate the upper housing from the lower housing.

Other conventional wrist-worn electronic devices may incorporate a housing assembly that is a unibody housing, which includes a bottom wall, one or more side walls and an opening along an upper surface within which a display is positioned (additional openings may be formed within the bottom wall and the side walls to accommodate optical heart rate components and pushbuttons, respectively), and one or more antennas that are positioned on an upper surface of the one or more side walls and/or within the opening for the display. As the side walls of a unibody housing of such conventional wrist-worn electronic devices do not typically contain an opening having a shape that is suitable for a slot antenna, conventional wrist-worn electronic devices having a unibody housing do not typically incorporate any slot antennas partially formed by the side walls of the unibody housing.

Accordingly, there is a need for techniques for electrically isolating one or more antennas that are at least partially formed by portions of the housing assembly to enable use of any material for other portions of the housing assembly.

SUMMARY OF THE INVENTION

Embodiments of the present technology provide a wrist-worn electronic device with a configuration that substantially electrically shields a first antenna from a portion of a housing. The electronic device broadly comprises a lower housing, an upper housing, an electrically non-conductive element, a first antenna and a location determining element. The lower housing includes a molded cover and an outer portion. The molded cover includes a first portion composed of an electrically conductive material, a second portion composed of an electrically non-conductive material and a surface having a first electrical ground location and a second electrical ground location. The upper housing opposes the molded cover, includes a bezel formed of an electrically conductive material and has a third electrical ground location and a fourth electrical ground location electrically coupled with the first electrical ground location and the second electrical ground location on the surface of the molded cover, respectively. The second portion of the molded cover substantially electrically shields the first antenna from the outer portion of the lower housing. The outer portion of the lower housing may be composed of a non-homogenous material, such as carbon fiber, or a homogenous material, such as titanium. The electrically non-conductive element is positioned between the lower surface of the bezel and the upper surface of the molded cover. The first antenna is configured to wirelessly receive a first electronic signal. The first antenna is formed by a first nonconductive slot formed between a first portion of the lower surface of the bezel along a circumference of the bezel between the third electrical ground location and the fourth electrical ground location, a first portion of the upper surface of the molded cover along a circumference of the molded cover corresponding to the first portion of the lower surface of the bezel, and two electrical ground contacts each electrically coupling the first electrical ground location and the second electrical ground location on the upper surface of the molded cover with the third electrical ground location and the fourth electrical ground location on the lower surface of the bezel, respectively. The height of the first nonconductive slot corresponds to a height of the electrically nonconductive element, which separates the lower surface of the bezel and the upper surface of the molded cover.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWINGS

Embodiments of the present disclosure are described in detail below with reference to the attached drawing figures, wherein.

Figure 1A:
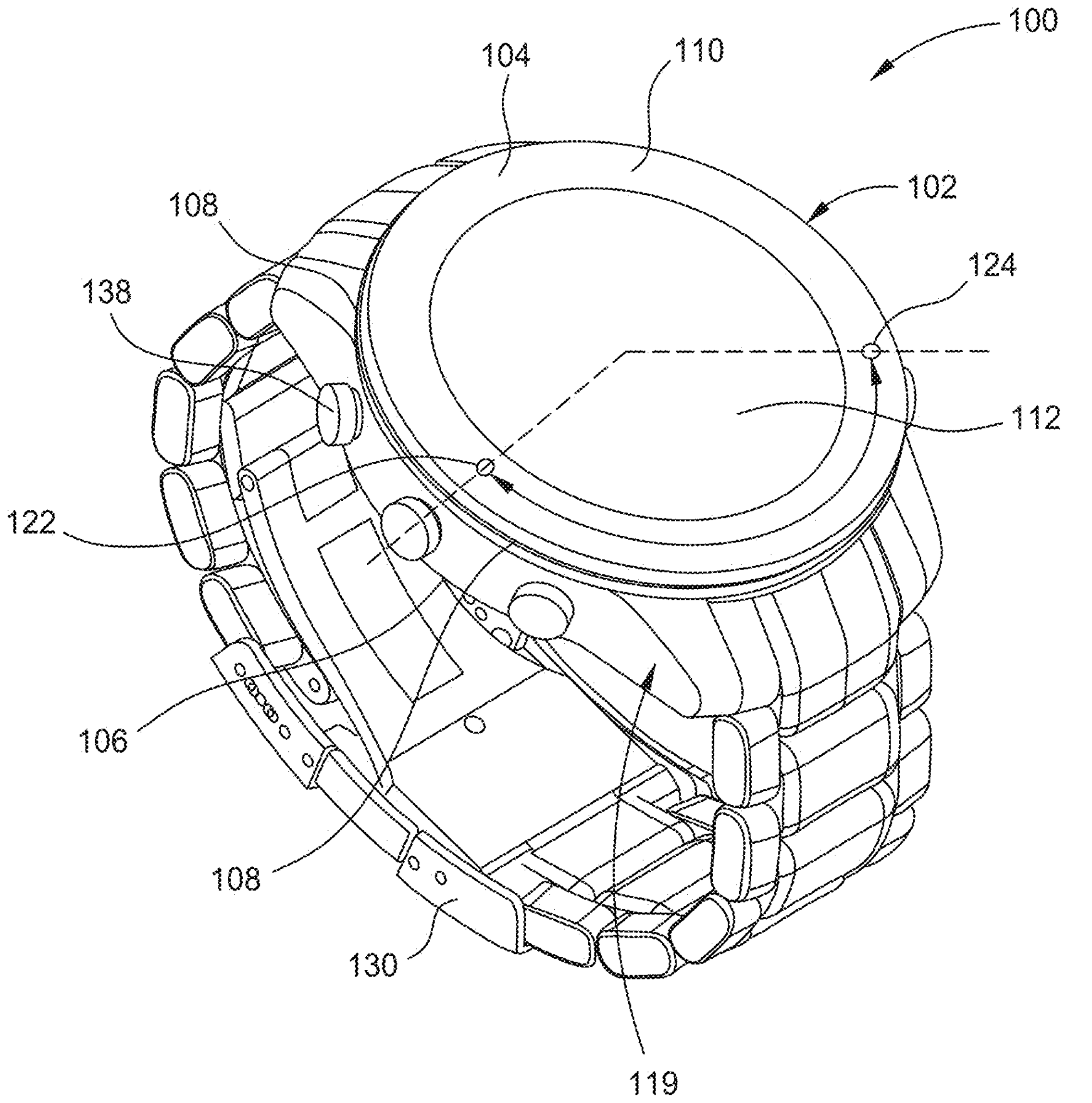
FIG. 1A is perspective view of a housing assembly of a wrist-worn electronic device according to some embodiments of the present disclosure.
Figure 1B:
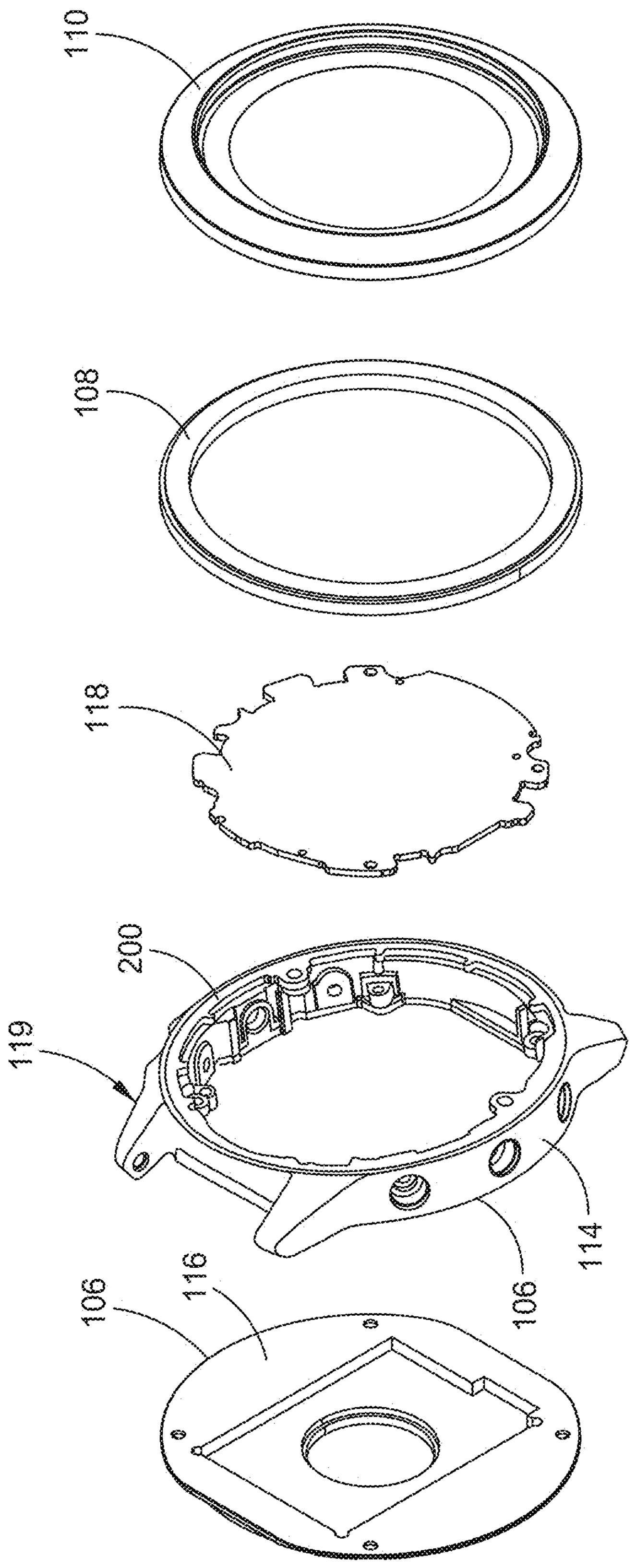
FIG. 1B is an exploded view of the housing assembly of FIG. 1A according to some embodiments of the present disclosure.

The drawing figures do not limit the present disclosure to the specific embodiments disclosed and described herein. The drawing figures are also not necessarily to scale, emphasis instead being placed upon clearly illustrating the principles of the present disclosure.

DETAILED DESCRIPTION OF THE INVENTION

The following detailed description references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

Relational and/or directional terms, such as "above", "below", "up", "upper", "upward", "down", "downward", "lower", "top", "bottom", "inner", etc., along with orientation terms, such as "horizontal" and "vertical", may be used throughout this description. These terms retain their commonly accepted definitions and are used with reference to embodiments of the present disclosure and the positions, directions, and orientations thereof shown in the accompanying figures. Embodiments of the present disclosure may be positioned and oriented in other ways or move in other directions. Therefore, these terms do not limit the scope of the present disclosure.

Example aspects of the present disclosure are directed to wrist-worn electronic devices having one or more antennas at least partially formed by portions of the housing assembly that are electrically isolated and shielded from other portions of the housing assembly. Effective electrical isolation of the portions of the housing assembly that do not partially form the one or more antennas enables those isolated portions of the housing assembly to be composed of any material.

In embodiments, the isolated portions of the housing assembly may be composed of a homogenous material or a non-homogenous material having a different electrical conductivity than a material from which portions of the housing assembly at least partially forming the one or more antennas is composed of. For instance, the isolated portions of the housing assembly may be composed of a first homogenous material (e.g., titanium, stainless steel, graphite, etc.) having a lower electrical conductivity than a second homogenous material (e.g., silver, copper, gold, etc.) that at least partially forms the one or more antennas of a wrist-worn electronic device. Similarly, the isolated portions of the housing assembly may be composed of a non-homogeneous material (e.g., carbon fiber, carbon reinforced plastic, etc.) having a lower electrical conductivity than a homogenous material (e.g., silver, copper, gold, etc.) that at least partially forms the one or more antennas of a wrist-worn electronic device. It is to be understood that the homogenous material may be any metal or metal alloy. In this manner, effective electrical isolation of portions of the housing assembly that at least partially form the antenna from other portions of the housing assembly enables those other portions housing assembly, such as the outer portions of the housing assembly, to be composed of any material, homogeneous or non-homogeneous.

Electrical isolation of portions of the housing assembly that at least partially form the one of more antennas of the wrist-worn electronic device from other portions of the housing assembly, such as outer portions of the housing assembly, may be achieved using the arrangements or techniques disclosed herein. In embodiments, the wrist-worn electronic device includes a housing assembly including an upper housing and a lower housing, each having an upper portion and a lower portion. In other embodiments, the housing assembly is a single housing that forms an upper and a lower portion of the wrist-worn electronic device. One or more sidewalls and lugs for attaching a wrist-band or strap to the housing assembly may each be part of the housing assembly. In embodiments, the wrist-worn electronic device includes an electrically non-conductive element, such as an annular ring composed of a non-conductive material, such as plastic, that is positioned between the upper housing and the lower housing. In other embodiments, the electrically non-conductive element is a portion of the upper housing, the lower housing or a combination thereof.

In some embodiments, the upper housing may be formed by a bezel and the lower housing may be formed by one or more side walls, a bottom wall, lugs for attaching a wrist-band or strap to the housing assembly, and a molded cover within a first portion of the lower housing that physically and electrically isolates and shields the slot antenna from the outer portion of the lower housing. In other embodiments, the upper housing may be formed by a bezel and one or more side walls and the lower housing may be formed by one or more side walls, a bottom wall, lugs for attaching a wrist-band or strap to the housing assembly, and a molded cover within a first portion of the lower housing that physically and electrically isolates and shields the slot antenna from the outer portion of the lower housing.

In embodiments, the housing assembly may be formed by a bezel, one or more side walls, a bottom wall, lugs for attaching a wrist-band or strap to the housing assembly, and a molded cover proximate to the inner surface of the one or more side walls that physically and electrically isolates and shields the slot antenna from the outer portion of the lower housing.

The molded cover is formed by a first portion that is composed of electrically conductive material (e.g., silver, copper, gold, etc.) and a second portion composed of an electrically non-conductive material that isolates and shields the slot antenna from the one or more outer portions of the housing assembly. In this manner, the outer portion of the housing assembly may be composed of any material or combination of materials suitable for a wrist-worn electronic device.

In some embodiments, the molded cover may be incorporated within, applied to or positioned on the lower housing such that the first portion of the molded cover forms a lower portion of the slot antenna and the second portion of the molded cover physically and substantially electrically isolates the outer portion of the lower housing from the slot antenna. More particularly, the molded cover may be incorporated within, applied over or positioned on one or more surfaces (inner surfaces, upper surfaces, or a combination thereof) of the outer portion of the lower housing such that the first portion of the molded cover partially forms the slot antenna and the second portion of the molded cover, which is composed of electrically non-conductive material, substantially electrically isolates and shields the slot antenna from the outer portion of the lower housing.

In embodiments, the electrically non-conductive material from which the second portion of the molded cover is composed of may be applied as an injection molding, in one or more layers, to evenly coat substantially all upper and/or inner surfaces of the inner portion of the lower housing to physically and electrically isolate and shield the slot antenna from the outer portion of the lower housing. In this manner, the molded cover, specifically the second portion thereof that is composed of the electrically non-conductive material, may physically and substantially electrically isolate and shield the slot antenna from the outer portion of the lower housing.

The lower housing includes one or more sidewalls that form an outer portion of the lower housing and enclose the molded cover. The outer portions of the lower housing may be composed of any material, such as carbon fiber or a metal (e.g., titanium, stainless steel, etc.), or other material suitable for a wrist-worn electronic device. Accordingly, the outer portions of the lower housing may be composed of a material having a lower electrical conductivity than the electrically conductive material from which the first portion of the molded cover is composed. In embodiments, the lugs for attaching a wrist-band or strap to the housing assembly are composed of the same material as the one of the more sidewalls forming an outer portion of the lower housing and enclosing the molded cover.

In embodiments, the upper housing is formed by an upper portion and a lower portion. The upper portion of the upper housing does not partially form the slot antenna and may be composed of any material, such as carbon fiber or a metal (e.g., titanium, stainless steel, etc.). The lower portion of the upper housing may be composed of electrically conductive material (e.g., silver, copper, gold, etc.) having a higher electrical conductivity than the carbon fiber or metal from which the upper portion of the upper housing is composed.

In embodiments, the outer housing includes one or more sidewalls forming an outer portion of the upper portion of the upper housing. In such embodiments, the outer portions of the upper housing may be composed of any material, such as carbon fiber or a metal (e.g., titanium, stainless steel, etc.), and that material may be different from the electrically-conductive material from which the lower portion of the upper housing is composed of the upper portion of the upper housing may include an opening that encloses a watch face of the wrist-worn electronic device and is visible to the user when worn by a user. Similar to the first portion of the molded cover, the lower portion of the upper housing that forms an upper portion of the slot antenna is composed of the electrically conductive material (e.g., silver, copper, gold, etc.).

Accordingly, the outer portion of the lower housing, the one or more sidewalls of the upper housing and the lower housing and the upper portion of the upper housing may be formed from any material or combination of materials suitable for a wrist-worn electronic device.

As described above, for each slot antenna, an upper portion of the lower housing may be composed of the electrically conductive material to form a lower portion of the slot antenna, a lower portion of the upper housing may be composed of the electrically conductive material to form an upper portion of the slot antenna, and two elements formed of electrically conductive material that extend vertically between the lower housing and the upper housing forming two side portions of the slot antenna. Furthermore, the lower surface of the upper housing may include a first electrical ground location and a second electrical ground location that is spaced apart (e.g., along a circumference of the upper housing) from the first electrical ground location. In embodiments, two elements composed of electrically conductive material extend vertically from the first portion of the molded cover at electrical ground locations that correspond to the first electrical ground location and the second ground location on the lower surface of the upper housing to form side portions of the slot antenna. The upper portion of the slot antenna may extend between the first electrical ground location and the second electrical ground location on the lower surface of the upper housing, and the lower portion of the slot antenna may extend between the corresponding electrical ground locations on the molded cover.

The upper portion of the slot antenna (that is, the lower portion of the upper housing) has at least three electrical connections as each slot antenna is associated with a signal feed point and the two electrical ground points that define a width of the slot antenna. The lower portion of each slot antenna has a corresponding signal feed point and corresponding electrical ground points that correspond to the electrical ground points on the upper housing. Two elements composed of electrically conductive material extend vertically between the corresponding electrical ground points of the upper housing and the molded cover of the lower housing.

The electrically conductive material from which the first portion of the molded cover and the lower portion of the upper housing are formed may be a metal or metal plating that includes, without limitation, silver, copper, or gold, the electrically non-conductive material from which the second portion of the molded cover is formed may include, without limitation, a non-conductive ceramic, a plastic, or a composite. In this manner, the second portion of the molded cover substantially isolates and shields the slot antenna from the outer portion of the lower housing and the outer portion of the upper housing, each of which may be composed of any suitable material or combination of materials without affecting the performance of the antenna.

It is to be understood that the molded cover, which is within the first portion of the lower housing, and the outer portion of the lower housing may be positioned in any configuration that enables the second portion of the molded cover to substantially electrically shield the antenna from the outer portion of the lower housing. For example, in some embodiments, the molded cover may be positioned in an upper portion of the lower housing and the outer portion of the lower housing may be a lower portion of the lower housing. As the molded cover is formed by the first portion and the second portion of the molded cover, the first portion of the molded cover may be an upper portion of the molded cover and the second portion of the molded cover may be a lower portion of the molded cover, in such embodiments. As another example, in other embodiments, the molded cover may be an inner portion of the lower housing and the outer portion of the lower housing may be an outer portion of the lower housing. In such embodiments, the first portion of the molded cover may be an inner portion of the molded cover and the second portion of the molded cover may be an outer portion of the molded cover. As another example, in embodiments, the molded cover may be both an upper portion and an inner portion of the lower housing. In such embodiments, the first portion of the molded cover and the second portion of the molded cover may be both an upper portion and an outer portion of the molded cover. The outer portion of the lower housing may be a lower portion of the lower housing and an outer portion of the lower housing.

Although the above overview was discussed with respect to slot antennas, the scope of the present disclosure is not so limited. The wrist-worn electronic device may incorporate any other suitable type(s) of antennas, such as a loop antenna formed at least partially by the bezel. Similar to embodiments related to the wrist-worn electronic device including one or more slot antenna, the first portion of the molded cover may be formed from the conductive material (e.g., silver, copper, gold) and the second portion of the molded cover may be formed from a non-conductive material (e.g., ceramic, plastic, composite, etc.) so that the second portion of the molded cover may isolate the loop antenna from the remaining portion of the housing assembly, such as the outer portion of the lower housing. Furthermore, in such embodiments, a non-conductive spacer that is positioned between the upper housing and lower housing of wrist-worn electronic devices having slot antennas may not be needed as the second portion of the molded cover that is formed from the non-conductive material may sufficiently isolate and shield the loop antenna from the outer portion of the lower housing.

It is to be understood that the techniques disclosed herein may be used to form one or more antennas configured to wirelessly transmit or receive signals for communications, location signals used to determine a current geolocation (e.g., global positioning system (GPS) coordinates) or communicate with cellular networks (e.g., LTE, GSM, etc.) and wireless networks having any suitable protocol. For instance, the wireless networks may enable the transmission or exchange of data over short distances from fixed and mobile devices of communication including, but not limited to, wireless local area networks (i.e., IEEE 802.11) and personal area networks (e.g., Bluetooth, infrared (IR) wireless, ultra wideband (UWB), ZigBee, etc.). The technologies utilized to send and/or receive data wirelessly may include standardized or proprietary signal broadcasts from broadcast towers and base stations installed at fixed or mobile locations.

It is to be understood that the embodiments described herein related to the housing assembly having an upper housing and a lower housing may be implemented as a unibody housing. Similar to the embodiments described herein related to the housing assembly formed by an upper housing and a lower housing, the unibody housing includes a bottom wall, one or more side walls and an opening along an upper surface within which a display is positioned. The one or more side walls incorporate at least one opening having a shape that is suitable for a slot antenna. For example, an embodiment in which a single opening exists in the side wall between a 12:00 position and a 3:00 position of the watch face (existing in a clockwise direction), the side wall between the 3:00 position to the 12:00 position of the watch face (in the clockwise direction) may be substantially without openings, which may exist to accommodate one or more pushbuttons. In such embodiments, the housing assembly may be formed by removing the internal cavity and the one or more openings within the side walls from a solid block of a homogenous material, such as titanium, stainless steel or graphite. Similar to the embodiments described herein related to the housing assembly formed by an upper housing and a lower housing, the unibody housing includes a molded cover including a first portion composed of an electrically conductive material and a second portion composed of an electrically non-conductive material that substantially electrically shields one or more antennas from the outer portion of the unibody housing. The second portion of the molded cover may be applied to the inner surfaces of the one or more side walls via an injection molding process in one or more layers to evenly coat substantially all upper and/or inner surfaces of the side walls to physically and electrically isolate and shield the one or more antennas from the outer portion of the unibody housing. Once the second portion of the molded cover has cured, the first portion of the molded cover composed of an electrically conductive material (e.g., silver, copper, gold) may be applied over the second portion of the molded cover.

Example aspects of the present disclosure provide numerous technical effects and benefits. For instance, the molded cover allows portions of a housing assembly of a wrist-worn electronic device to be substantially electrically isolated from an antenna of the wrist-worn electronic device. More particularly, the portion of the molded cover that is composed of non-conductive material may be applied to or position on surfaces of the housing assembly that are not associated with the antenna, such as the inner surface of the sidewall of the lower housing of the housing assembly. In this manner, the molded cover, specifically the portion thereof that is formed from the non-conductive material, may substantially electrically isolate the antenna from the portions of the housing assembly that are not associated with the antenna so that those portions of the housing assembly may be formed any suitable material or combination of materials without affecting the performance of the antenna.

Embodiments of the technology will now be described in more detail with reference to the drawing figures. Referring initially to FIG. 1A, a wrist-worn electronic device 100 is illustrated. The wrist-worn electronic device 100 includes a housing assembly 102. The housing assembly 102 includes an upper housing 104 and a lower housing 106. In some embodiments, a spacer 108 composed of a non-conductive material may be positioned between the upper housing 104 and the lower housing 106. In other embodiments, one or more openings may be formed within the side wall that each have a shape that is suitable for a slot antenna and are filled with electrically non-conductive material, such as a ceramic.

The upper housing 104 may include a bezel 110. In embodiments, the bezel 110 may form an upper portion of the upper housing 104 and may generally encircle a display 112 of the wrist-worn electronic device 100. The shape of bezel 110 conforms to the shape of the upper housing 104 and the display 112 of the wrist-worn electronic device 100 such that the bezel 110 may be positioned around the display 112. For an upper housing 104 having a circular watch face, the bezel 110 may have an annular (ring) shape. The bezel 110 may have an outer perimeter, or outer circumference, that corresponds to the upper housing 104 and an inner perimeter, or inner circumference, that corresponds to the outer perimeter of display 112 of the wrist-worn electronic device 100. For example, the bezel 110 may have an inner edge with dimensions that are smaller than or approximately equal to the perimeter dimensions of display 112 and an outer edge with dimensions that are approximately equal to the perimeter dimensions of an upper surface of the upper housing 104. Thus, the bezel 110 may be circular, square, or rectangular with a central opening through which the display 112 may be viewed.

In some embodiments, the bezel 110 may rotate in place, roughly around the center of the upper housing 104. In other embodiments, the bezel 110 may be fixedly attached to the upper housing 104 and may not rotate. In embodiments, the bezel 110 may be integral to the upper housing 104. For example, the bezel 110 may be a raised or flush portion of the upper housing 104, with a central opening through which the display may be viewed, and the bezel 110 may be positioned above the spacer 108. In various embodiments, the height of bezel 110 may be aligned with a lens of the display 112.

The lower housing 106 may include a sidewall 114 and a bottom wall 116. An outer surface of the sidewall 114 of the lower housing 106 is visible once the wrist-worn electronic device 100 is fully assembled. The sidewall 114 and bottom wall 116 of the lower housing 106 may collectively define an internal cavity 121 in which one or more components of the wrist-worn electronic device may be located. An outer surface 117 of the bottom wall 116 may contact a user's skin when worn by the user. In embodiments, the lower housing 106 may be shaped to incorporate lugs 119 between which a strap or wrist band may be positioned to secure the housing assembly 102 to a user's wrist. The internal cavity 121 may retain components such as, but not limited to, the location determining element 140, the communication element 142, the processing element 132, the memory element 134, and the printed circuit board 118.

A printed circuit board 118 of the wrist-worn electronic device may be located within the internal cavity 121. In some embodiments, the printed circuit board 118 includes one or more electronic components and may be electrically coupled to portions of the lower housing 106. Furthermore, in such embodiments, the printed circuit board 118 and the portions of the lower housing 106 may jointly form a ground plane for one or more antennas of the wrist-worn electronic device 100.

Figure 5A:
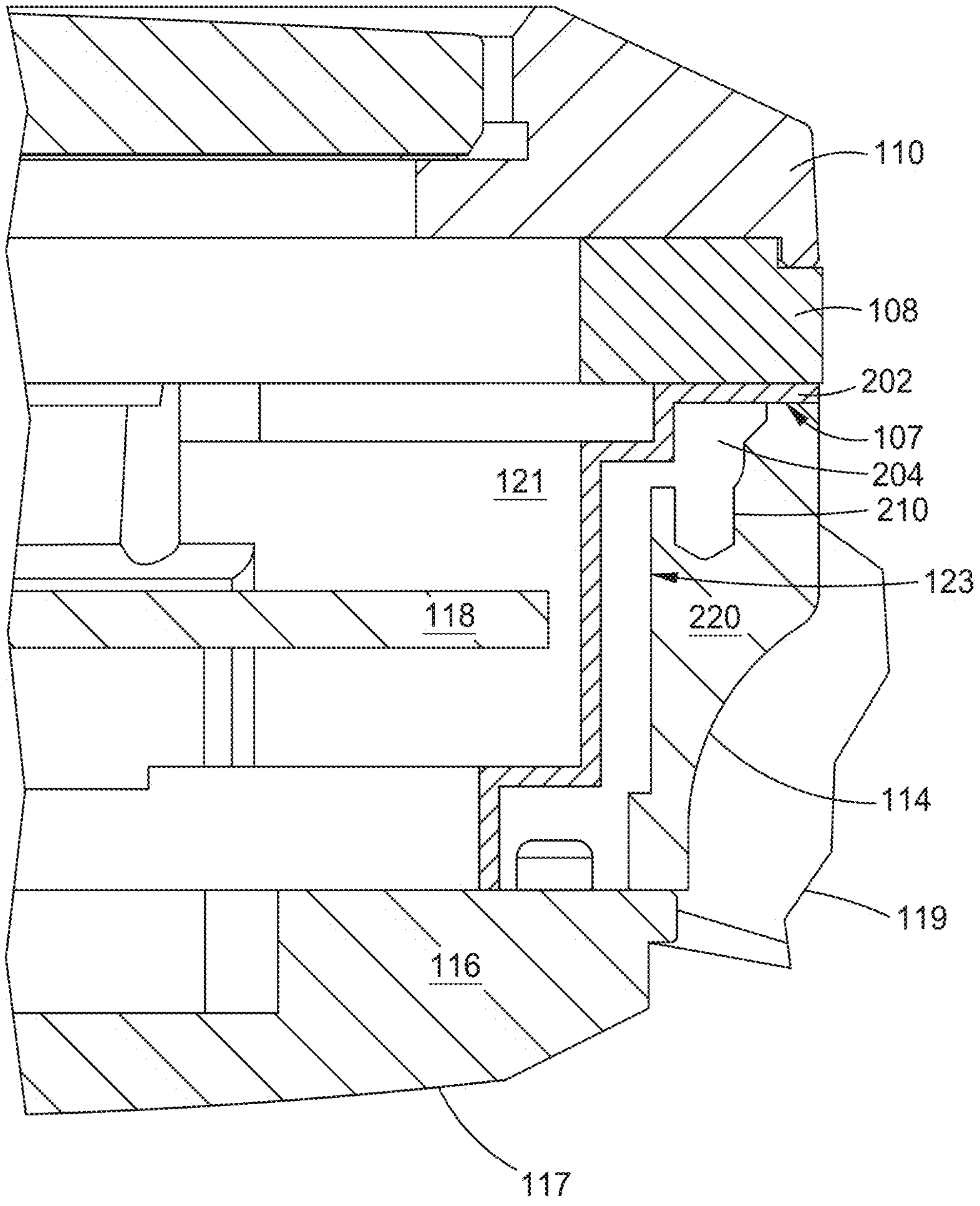
FIG. 5A is a cross-sectional view of a molded cover applied to an inner surface of a lower housing of a housing assembly of a wrist-worn electronic device according to some embodiments of the present disclosure.
Figure 5B:
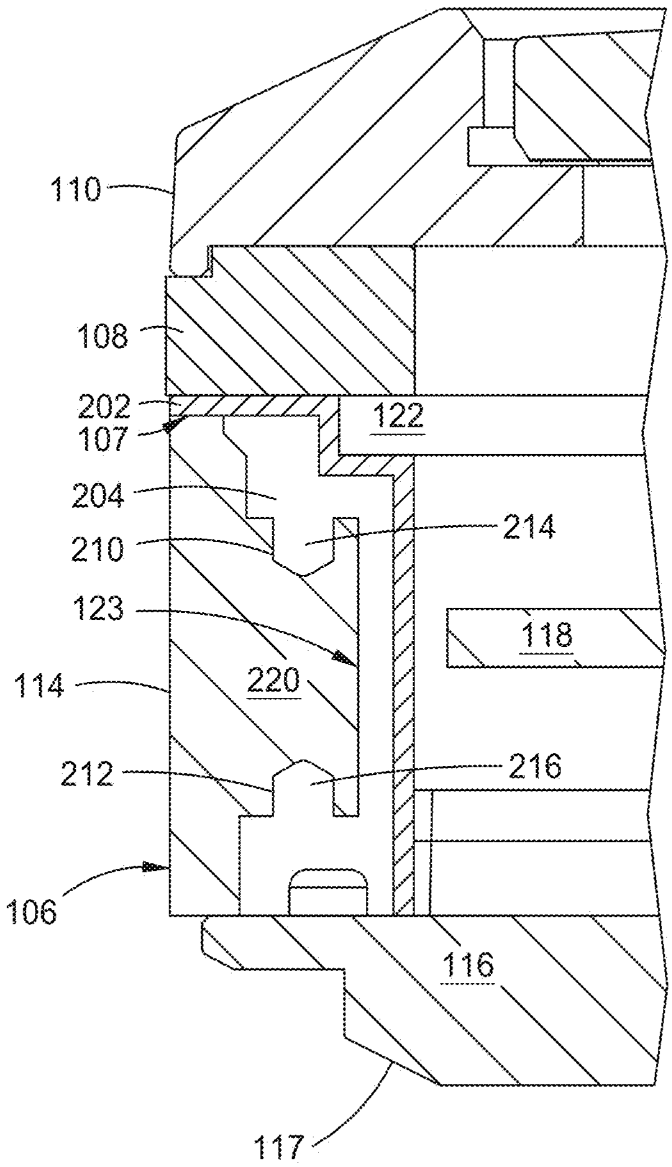
FIG. 5B is another cross-sectional view of a molded cover applied to an inner surface of a lower housing of a housing assembly of a wrist-worn electronic device according to some embodiments of the present disclosure.

As shown, housing assembly 102 of the wrist-worn electronic device includes a molded cover 200. The molded cover 200 includes a first portion 202 composed of a conductive material (e.g., silver, copper, gold, etc.) and a second portion 204 composed of a non-conductive material (e.g., a ceramic). As discussed above, in some embodiments, the first portion 202 may be an upper portion of the molded cover 200 and the second portion 204 may be a lower portion of the molded cover 200. In other embodiments, the first portion 202 may be an inner portion of the molded cover 200 and the second portion 204 may be an outer portion of the molded cover 200. In embodiments, as shown in FIGS. 5A and 5B, the first portion 202 may be both an upper portion and an inner portion of the molded cover 200 and the second portion 204 may be both a lower portion and an outer portion of the molded cover 200.

The second portion 204 of the molded cover 200 is composed of a non-conductive material (e.g., ceramic, plastic, composite) that physically and substantially electrically isolates the antenna from the portions of the housing assembly 102 that are not associated with the antenna so that those portions of the housing assembly 102 may be formed any suitable material or combination of materials without affecting the performance of the antenna. A bottom surface or a side surface of the second portion 204 of the molded cover 200 may be positioned over or adjacent to the outer portion 220 of the lower housing 106 at an affixing surface 123. As shown in FIGS. 5A and 5B, the affixing surface 123 between the second portion 204 of the molded cover 200 and the outer portion 220 of the lower housing 106 may be a combination of vertical surfaces and horizontal surfaces as the first portion 202 of molded cover 200 may be both an upper portion and an inner portion of the molded cover 200 and the second portion 204 of molded cover 200 may be both a lower portion and an outer portion of the molded cover 200.

By placing the molded cover 200 over and/or adjacent to the outer portion 220 of the lower housing 106, the second portion 204 of the molded cover 200 may substantially isolate the antenna of the wrist-worn electronic device 100 from the outer portion 220 of the lower housing 106 such that the outer portion 220 lower housing 106 may be formed from an electrically conductive material, an electrically non-conductive material or a semi-conductive material, such as carbon fiber, without affecting the performance of the antenna. In this manner, the second portion 204 of the molded cover 200 is composed of a non-conductive, composite material and shaped such that the second portion 204 physically and substantially electrically isolates the antenna from the outer portion 220 of the lower housing 106, which may be composed of any material or combination of homogenous or non-homogenous materials suitable for wrist-worn electronic device 100. Thus, in contrast to the lower housing of conventional wrist-worn electronic devices, the lower housing 106 in accordance with the present disclosure are not limited to being composed of a material that are suitable for the one or more antennas of the wrist-worn electronic devices 100.

The outer portion 220 of the lower housing 106 may be composed of a homogenous or a non-homogenous material having a first electrical conductivity that is less than a second conductivity of material from which first portion 202 of molded cover 200 or the bezel 110 are composed of. Furthermore, the non-conductive material from which the second portion 204 of the molded cover 200 is composed of may be a composite material.

As it is commonly desirable to limit the thickness of the housing assembly 102 (combined height of the upper housing 104, lower housing 106 and non-conductive spacer 108, the molded cover 200 may be incorporated within the lower housing 106 in a manner that minimizes any thickness added to the height of the housing assembly 102 by use of the molded cover 200. For example, the molded cover 200 may form a first portion 202 of the lower housing and be positioned above and/or adjacent to the outer portion 220 of the lower housing 106. In some embodiments, the molded cover 200 may be pressed over the outer portion 220 of the lower housing 106 as the affixing surface 123 may have recesses, cavities and protrusions that align with and correspond to recesses, cavities and protrusions of the corresponding surface of the outer portion 220 of the lower housing 106. In other embodiments, the molded cover 200 may be applied to the outer portion 220 of the lower housing 106 via an injection molding process. For example, the non-conductive material that forms the second portion 204 of the molded cover 200 may be applied to the outer portion 220 of the lower housing 106 as one or more layers, starting with the affixing surface 123. More specifically, the non-conductive material may be applied to the outer portion 220 of the lower housing 106 to form a first or initial layer of the second portion 204 of the molded cover 200. After the outer portion 220 of the lower housing 106 has been coated with the first layer of material from which the second portion 204 of the molded cover 200 is composed of, a second layer and additional layers of the non-conductive material may be further applied to the first layer of the second portion 204 to form a second layer and additional layers of the second portion 204 of the molded cover 200. It should be appreciated that this process is repeated until the second portion 204 of the molded cover 200 has a desired thickness that is needed to substantially isolate and shield the antenna from the outer portion 220 of the lower housing 106, which enables the outer portion 220 of the lower housing 106 to be formed from any material suitable for the one or more antennas of the wrist-worn electronic device 100 without affecting the performance of the one or more antennas.

In some embodiments, a thickness of the second portion 204 of the molded cover 200 may not be uniform and may be thicker in certain areas that require additional physical separation and shielding. For instance, the second portion 204 of the molded cover 200 may be thicker in areas that are proximate to the one or more antennas of the wrist-worn electronic device 100. The thickness of the second portion 204 of the molded cover 200 in those areas is sufficient to physically isolate the first portion 202 of the molded cover 200, which may be composed of a first homogenous metal/metal alloy (e.g., silver, coper, gold, etc.), from the outer portion 220 of the lower housing, which may be composed of a second homogenous metal/metal alloy (e.g., stainless steel, titanium, graphite, etc.) that has a lower electrical conductivity than the first homogenous metal/metal alloy.

It should be appreciated that the electrically conductive material that composes the first portion 202 of the molded cover 200 may be applied to the second portion 204 of the molded cover 200 using any suitable method. For example, the electrically conductive material for the first portion 202 of the molded cover may be applied to the second portion 204 of the molded cover 200 using a sputtering process or a physical vapor deposition (PVD) process.

Figure 2:
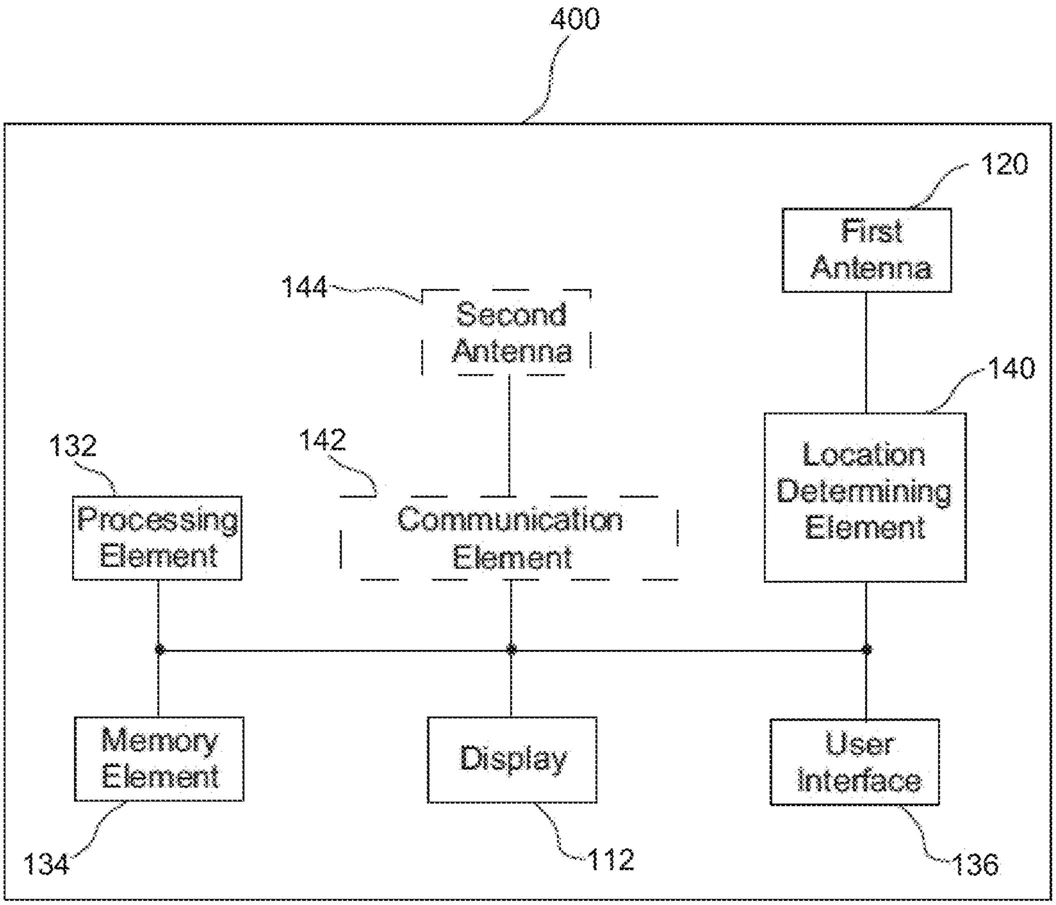
FIG. 2 is a schematic block diagram illustrating electrically coupled functional components of the wrist-worn electronic device of FIG. 1A.

In embodiments, a bottom surface of the upper housing 104 and an upper surface of the molded cover 200 may each be composed of electrically conductive material and form a portion of one or more slot antennas of the wrist-worn electronic device 100. In such embodiments, the upper surface of the first portion 202 of the molded cover 200 may partially form a lower portion of the one or more antennas, such as a first antenna 120 or a second antenna 144 illustrated in FIG. 2. In such embodiments, first antenna 120 extends between first electrical ground location 122 and second electrical ground location 124. The housing assembly 102 also includes two elements formed of electrically conductive material that extend vertically between the upper housing 104 and the lower housing 106, at the corresponding two electrical ground locations, form the side portions of each slot antenna. Accordingly, a first antenna 120 of the wrist-worn electronic device 100 may be formed by a first nonconductive slot formed between a first portion of the lower surface of the bezel 110 along a circumference of the bezel 110 between the two electrical ground locations (e.g., first electrical ground location 122 and second electrical ground location 124), the upper surface of the first portion 202 of the molded cover 200 that corresponds to the first portion of the lower surface of the bezel 110, and two electrical ground contacts each extending vertically between the upper housing 104 and the lower housing 106 and electrically coupling one of the two electrical ground points on the upper surface of the first portion 202 of the molded cover 200 with a corresponding electrical ground location on the lower surface of the bezel 110, respectively. In such embodiments, the height of the first non-conductive slot may correspond to a height of the spacer 108.

In embodiments, the wrist-worn electronic device 100 includes a location determining element (such as location determining element 140 illustrated in FIG. 2) may be electrically coupled with the antenna. The location determining element may be configured to receive location signals from the antenna and determine a current geolocation of the wrist-worn electronic device 100 based on the location signals. In some embodiments, a length of the first portion of the circumference of the bezel 110 that is associated with the antenna of the wrist-worn electronic device may correspond to a wavelength of the location signals. For instance, in some embodiments, the length of the first portion of the circumference of the bezel 110 may be one-half of a wavelength of the location signals.

In some embodiments, the molded cover 200 and the outer portion 220 of the lower housing 106 may be formed such that each defines one or more interlocking features to facilitate securing the molded cover 200 to the outer portion 220 of the lower housing 106 at the affixing surface 123. For example, as shown in FIGS. 5A and 5B, the outer portion 220 of the lower housing 106 may define a recess at an inner and/or an upper location, and the corresponding surface of the second portion 204 of the molded cover 200 may include a projection having a shape that corresponds to a shape of the recess. In this manner, the projection of the second portion 204 of the molded cover 200 may fit within (e.g., fill) the recess of the outer portion 220 of the lower housing 106 to secure the molded cover 200 to the outer portion 220 of the lower housing 106. Similarly, as shown in FIG. 5B, an upper surface of the outer portion 220 of the lower housing 106 may define a first recess 210 and a lower surface may define a second recess 212 and the corresponding surfaces of the second portion 204 of the molded cover 200 may include a first protrusion 214 and a second protrusion 216 having a shape that corresponds to a shape of the first recess 210 and the second recess 212, respectively. The first protrusion 214 of the second portion 204 of the molded cover 200 may fit within the first recess 210 and the second protrusion 216 of the second portion 204 of the molded cover 200 may fit within the second recess 212. In this manner, the molded cover 200 may be secured to the outer portion 220 of the lower housing 106.

The outer surfaces of the housing assembly 102 enclose and do not expose the molded cover 200 once the lower housing 106, the spacer 108, and the upper housing 104 are combined. Similar to electrical components on the printed circuit board 118 within the internal cavity 121, the molded cover is not visible to the user of the wrist-worn electronic device. Thus, in embodiments, the outer surfaces that are visible to the user may include the outer (exposed) surfaces of the outer portion 220 of the lower housing 106, such as the outer surfaces of sidewall 114 and the outer surface 117 of the bottom wall 116, the upper housing 104, which may include a bezel 110, and the spacer 108.

Figure 6:
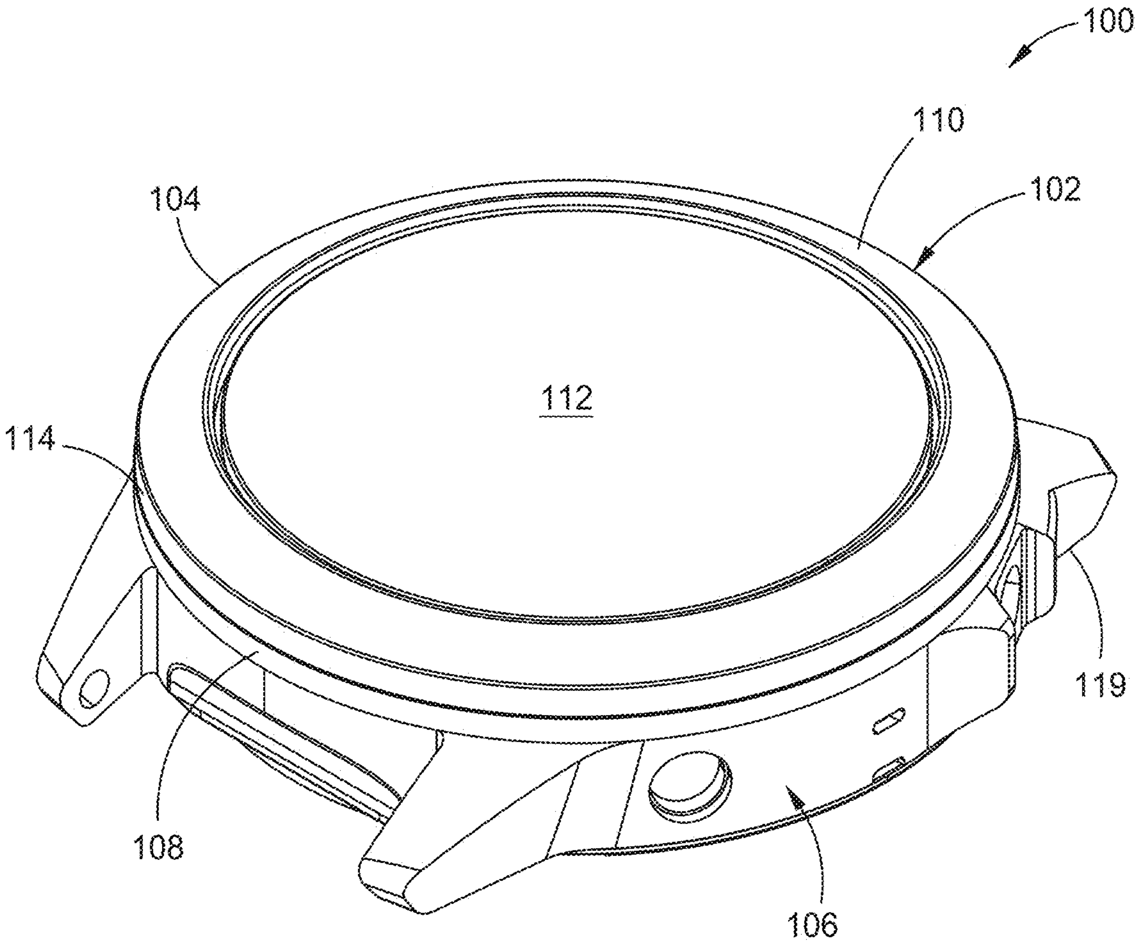
FIG. 6 is a perspective view of a housing assembly of a wrist-worn electronic device according to some embodiments of the present disclosure.
Figure 7:
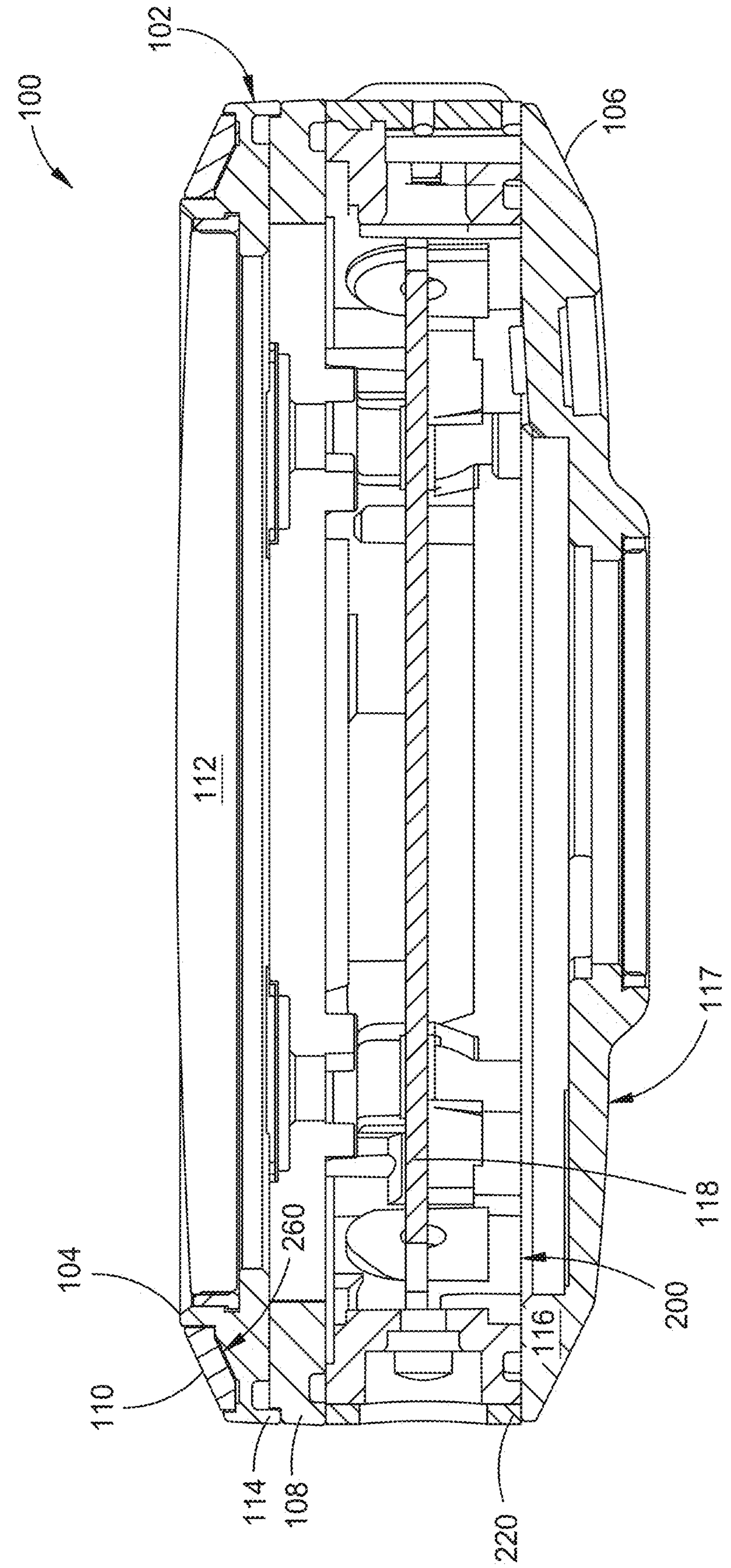
FIG. 7 is a cross-sectional view of the housing assembly of FIG. 6 according to some embodiments of the present disclosure.
Figure 8:
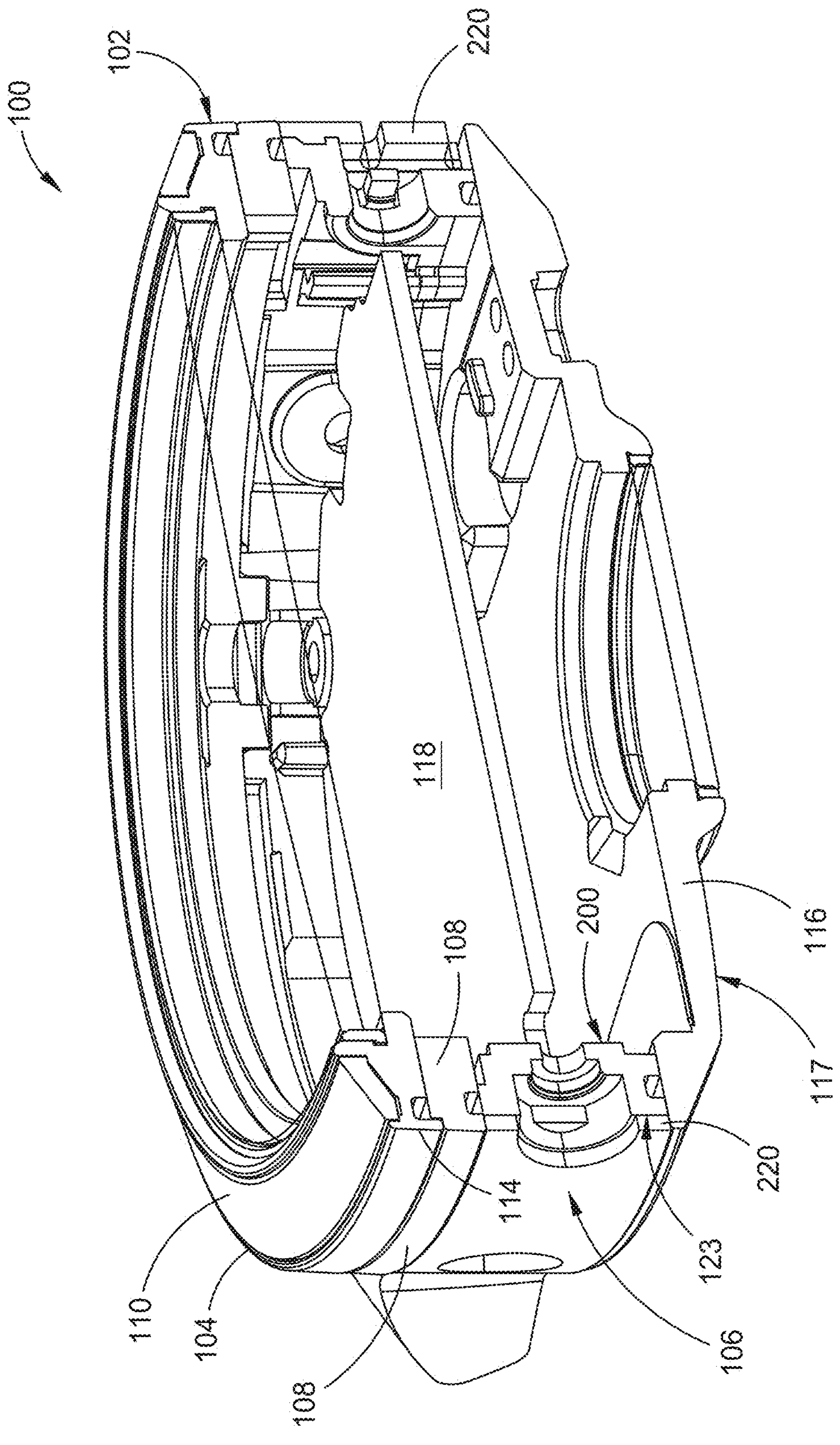
FIG. 8 is another cross-sectional view of the housing assembly of FIG. 6 according to some embodiments of the present disclosure.

Referring now to FIGS. 6-8, another embodiment of the housing assembly 102 is provided according to some embodiments of the present disclosure. In the illustrated embodiment, the bezel 110 is an upper portion of the upper housing 104, which also includes one or more sidewalls 114. The sidewalls 114 of both the lower housing 106 and the upper housing 104 would be visible to the user. In such embodiments, the upper housing 104 may include one or more sidewalls 114 that may be composed of any material, such as the same material from which the one or more sidewalls 114 of the lower housing 106 are composed. In contrast, the embodiment illustrated in FIGS. 5A-5B depicted the upper housing 104 formed substantially by the bezel 110 and its side wall.

In embodiments, the upper housing 104 may include the bezel 110 as a component that is positioned at an upper surface of the upper housing 104. For instance, the upper housing 104 may define a channel 260 that extends along a circumference of the upper housing 104 and in which the bezel 110 may be positioned. Similar to the molded cover 200 depicted in FIGS. 1A-5B, the molded cover 200 depicted in FIGS. 6-8 is enclosed by one or more sidewalls 114 of the lower housing 106.

The bezel 110 may be composed of a different material than other portions of the upper housing 104. For example, in some embodiments, the upper housing 104 may be composed of a metal and the bezel 110 may be composed of a composite or carbon fiber. Furthermore, in some embodiments, the one or more sidewalls 114 of the lower housing 106 may be composed of the same material that the bezel 110 is composed of. In other embodiments, the one or more sidewalls 114 of the lower housing 106 may be composed of a different material than the material from which the bezel 110 is composed.

In embodiments, the lower housing 106 may define one or more openings 222 to accommodate user-input devices 138 (e.g., pushbuttons, rotating knobs, etc.) and internal components of the wrist-worn electronic device that are situated within the internal cavity 121. In such embodiments, the molded cover 200 and the outer portion of the lower housing 106 may jointly define the one or more openings 222.

Figure 9:
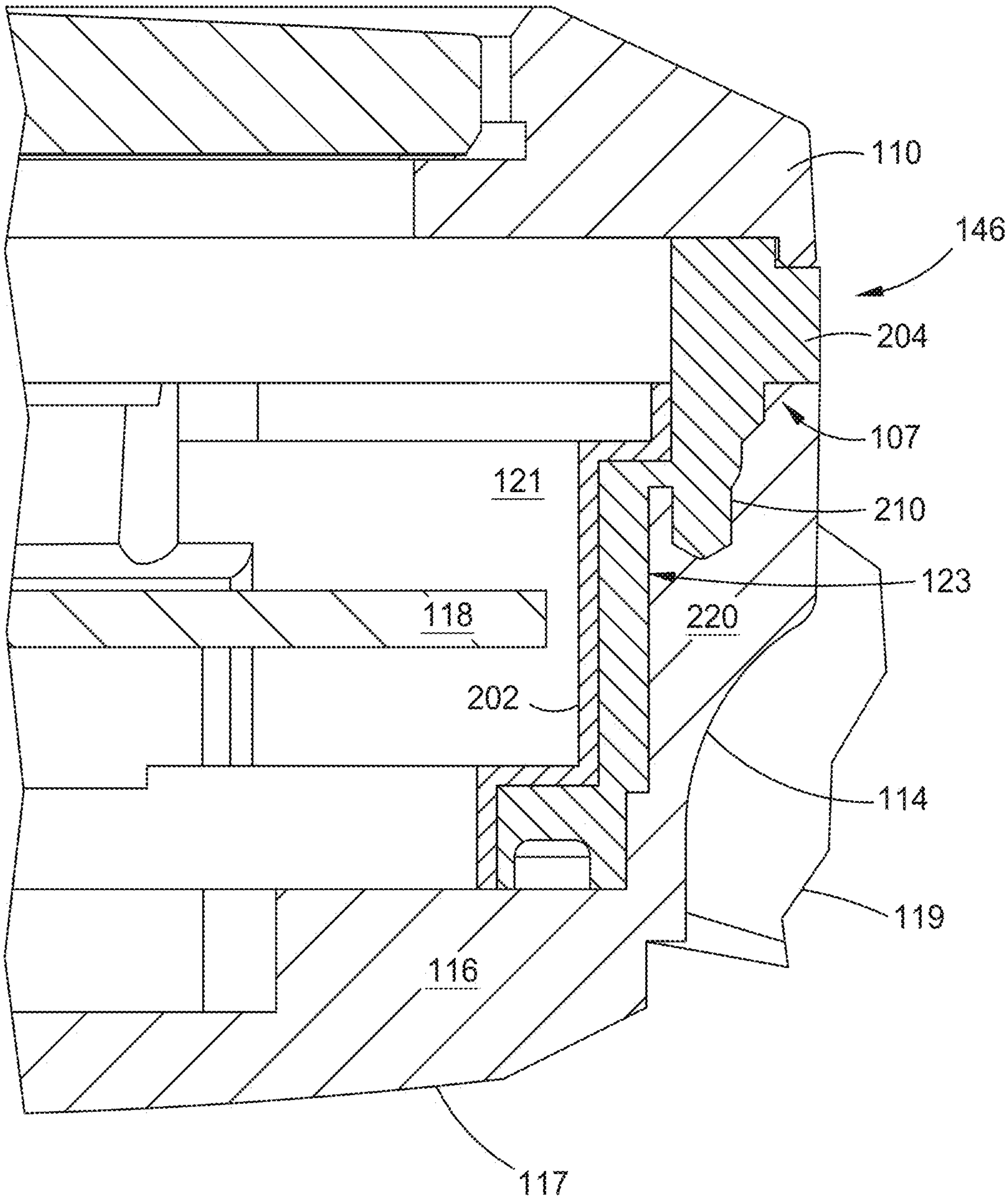
FIG. 9 is a perspective view of a housing assembly of a wrist-worn electronic device according to some embodiments of the present disclosure.
Figure 10:
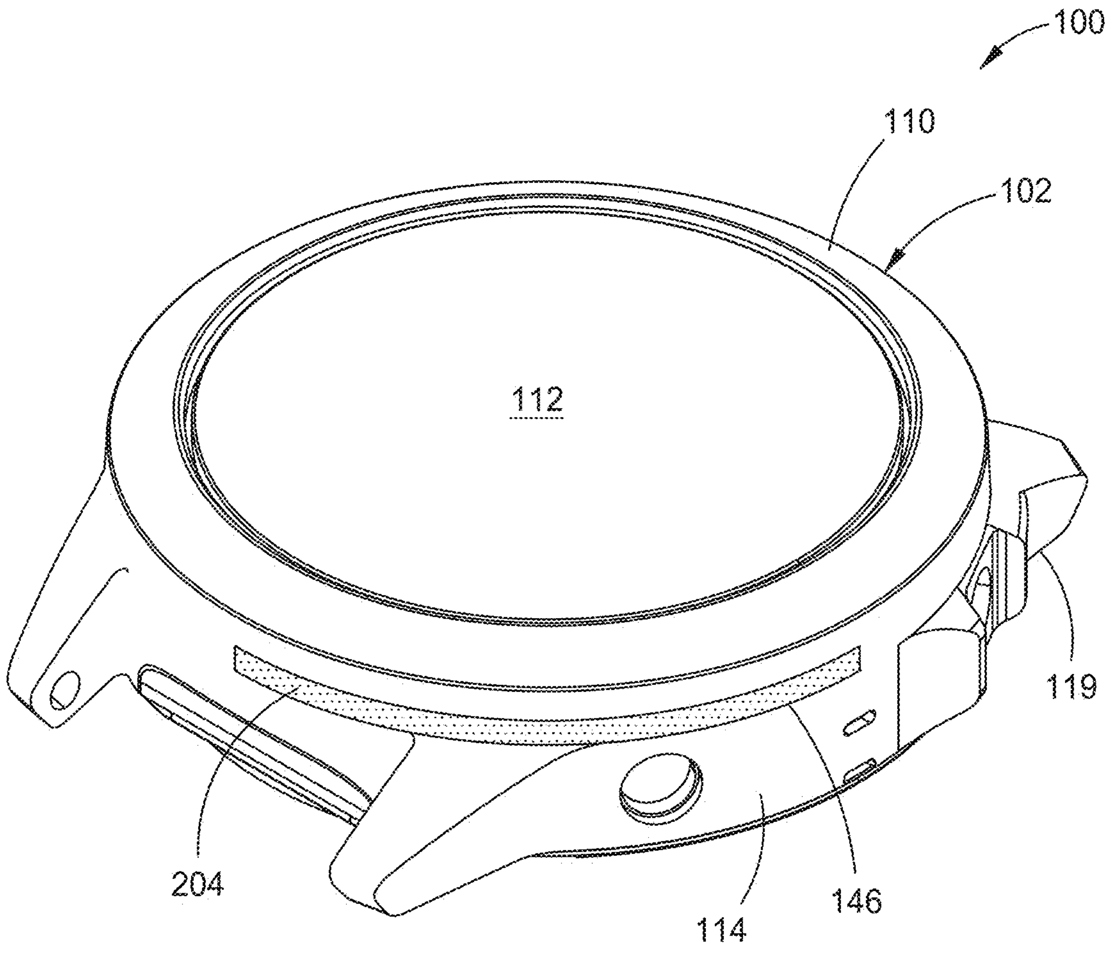
FIG. 10 is a cross-sectional view of the housing assembly of FIG. 9 according to some embodiments of the present disclosure.

FIGS. 9-10 depict an embodiment of the wrist-worn electronic device 100 in which housing assembly 102 is a unibody housing. Similar to the embodiments described herein related to the housing assembly 102 formed by an upper housing and a lower housing, in embodiments, the housing assembly 102 of a unibody housing has an upper portion above one or more slot antennas and a lower portion below the one or more slot antennas. In such embodiments, the unibody housing assembly 102 includes a bezel 110, a bottom wall 116, such as a base plate, and a side wall 114 extending from the bottom wall 116 to the bezel 110. As shown in the cross-sectional view of FIG. 9, unibody housing assembly 102 includes a molded cover 200 including a first portion 202 composed of an electrically conductive material and a second portion 204 composed of an electrically non-conductive material that substantially electrically shields one or more antennas from the unibody housing assembly 102 and partially forms an opening for each of the one or more slot antennas of the wrist-worn electronic device 100. As shown in FIG. 10, the side wall 114 of housing assembly 102 being a unibody housing includes one or more openings 146 associated with one or more slot antennas and in which the second portion 204 of the molded cover 200, which is composed of an electrically non-conductive material, is partially positioned. It is to be understood that side wall 114 may include additional openings through which a pushbutton or a rotating knob may pass.

In embodiments, the second portion 204 of the molded cover 200 may be applied to the inner surfaces of the one or more side walls 114 and within one or more openings 146 via an injection molding process in one or more layers to evenly coat substantially all upper and/or inner surfaces of the side walls 114 to physically and electrically isolate and shield the one or more slot antennas from the unibody housing 102. The second portion 204 of the molded cover 200 is composed of electrically non-conductive material to physically and electrically isolate the one or more slot antennas from the unibody housing 102. The electrically non-conductive material from which the second portion 204 of the molded cover 200 is formed may include, without limitation, a ceramic, a plastic, or a composite. In this manner, the unibody housing 102 may be composed of any material or combination of materials suitable for a wrist-worn electronic device 100.

Partially positioning the second portion 204 of the molded cover 200 in the one or more openings 146 within the side wall 114 in portions of the housing assembly 102 associated with one or more slot antennas provide a similar function as the non-conductive spacer 108 in the embodiments described herein related to the housing assembly 102 formed by an upper housing 104 and a lower housing 106, which are separated by the non-conductive spacer 108, as the upper portion of the unitary housing 102 is separated from the lower portion of the unitary housing 102 by the one or more openings 146 within the side wall 114 and the second portion 204 of the molded cover 200 positioned in the one or more openings 146. Similar to the non-conductive spacer 108 of those embodiments partially forming an opening for each of the one or more slot antennas of the wrist-worn electronic device 100, the height of each of the one or more openings 146 within the side wall 114 corresponds to a height of each slot antenna associated with the one or more openings 146. The vertical edges of each opening 146 within the side wall 114 serve a similar electrical function as the two electrical ground contacts that form the side portion of each slot antenna of the embodiments described herein related to the housing assembly 102 formed by an upper housing 104 and a lower housing 106.

Once the second portion 204 of the molded cover 200 has cured within or adjacent to the inner surfaces of the one or more side walls 114, the first portion 202 of the molded cover composed of an electrically conductive material (e.g., silver, copper, gold) may be applied over or adjacent to the second portion 204 of the molded cover 200. In embodiments, the first portion 202 of the molded cover 200 partially forms the one or more slot antennas associated with in the one or more openings 146 within the side wall 114.

Referring back to FIG. 1A, the wrist-worn electronic device 100 may be a watch, a wrist-worn smart phone, a wrist-worn navigation device, or other wearable multi-function electronic devices that may be secured to a user's wrist. Although the wrist-worn electronic device 100 is typically worn on a wrist, it may also be worn on other parts of the body such as the forearm or the upper arm. The user wearing the wrist-worn electronic device 100 may be involved in activities such as street running, trail running, jogging, hiking, walking, biking, swimming, exercising, etc.

During these activities, the wrist-worn electronic device 100 may monitor the user's current location, distance traveled, velocity, and other performance metrics by receiving wireless location signals from a satellite-based positioning system such as the global positioning system (GPS). In addition, the wrist-worn electronic device 100 may be wirelessly paired with other devices such as a heart rate monitor worn around the user's chest, a foot pod attached to the user's shoe for measuring jogging or running cadence and distance, a bike speed and cadence sensor attached to a crank arm and wheel hub of the user's bicycle for tracking biking performance, and so forth. Furthermore, the wrist-worn electronic device 100 may be able to communicate with smartphones, tablets, laptop or desktop computers, Wi-Fi routers, cell towers, and the like to allow the user to upload activity data, download apps, receive text messages, emails, and weather alerts, and so on.

As discussed above, the wrist-worn electronic device 100 may include first antenna 120. For example, the first antenna 120 may be a slot antenna having an upper portion that extends along a circumference of the bezel 110 between the first electrical ground location 122 and the second electrical ground location 124, which are depicted on the top surface of bezel 110 for illustrative purposes only. The lower portion of the first antenna 120 may extend along a circumference of the lower housing 106 between a first electrical ground location and a second electrical ground location that corresponds to the first electrical ground location 122 and the second electrical ground location 124.

The wrist-worn electronic device 100 includes a wrist band 130, a strap, or other attachment mechanisms. The housing assembly 102, specifically the lower housing 106, may include one or more lugs 119 configured to attach the wrist band 130 thereto. In this manner, the wrist-worn electronic device 100 may be secured to a user's wrist.

The wrist-worn electronic device 100 includes a processing element 132. The processing element 132 may include electronic hardware components such as processors, microprocessors (single-core or multi-core), microcontrollers, DSPs, field-programmable gate arrays (FPGAs), analog and/or digital application-specific integrated circuits (ASICs), or the like, or combinations thereof. The processing element 132 may generally execute, process, or run instructions, code, code segments, software, firmware, programs, applications, apps, processes, services, daemons, or the like. The processing element 132 may also include hardware components such as finite-state machines, sequential and combinational logic, and other electronic circuits that can perform the functions necessary for the operation of the current invention. The processing element 132 may be in communication with the other electronic components through serial or parallel links that include universal busses, address busses, data busses, control lines, and the like.

The wrist-worn electronic device 100 includes a memory element 134 that may include data storage components such as read-only memory (ROM), programmable ROM, erasable programmable ROM, random-access memory (RAM), or the like, or combinations thereof. The memory element 134 may include, or may constitute, a "computer-readable medium". The memory element 134 may store the instructions, code, code segments, software, firmware, programs, applications, apps, services, daemons, or the like that are executed by the processing element 132. In some embodiments, the memory element 134 may be embedded in, or packaged in the same package as, the processing element 132. The memory element 134 may also store data such as map, track, or route data, settings, documents, sound files, photographs, movies, images, databases, or the like.

The wrist-worn electronic device 100 includes a user interface 136. In some embodiments, the user interface 136 may include user-input devices 138 (e.g., pushbuttons, rotating knobs, etc.). For example, the user-input devices 138 may include pushbuttons located on the housing assembly 102, such as the outer surface of the sidewall of the lower housing 106. The user may interact (e.g., press) the pushbuttons to provide input to control operation of the wrist-worn electronic device 100. Alternatively, or additionally, the display 112 may include a touch screen that functions as at least a portion of the user interface 136. In this manner, the touch screen may allow a user to interact with the wrist-worn electronic device 100 by physically touching, swiping, or gesturing on areas of the display 112.

The wrist-worn electronic device 100 includes a location determining element 140. In some embodiments, the wrist-worn electronic device 100 may also include a communication element 142 and a second antenna 144. In some embodiments, the second antenna 144 may be configured as a slot antenna similar to the first antenna 120 discussed above. Details of these components of the wrist-worn electronic device 100 will now be discussed in more detail.

The location determining element 140 generally determines a current geolocation of the wrist-worn electronic device 100 and may process a first electronic signal, such as radio frequency (RF) electronic signals, from a global navigation satellite system (GNSS) such as the global positioning system (GPS) primarily used in the United States, the GLONASS system primarily used in Russia, or the Galileo system primarily used in Europe. The location determining element 140 may include satellite navigation receivers, processors, controllers, other computing devices, or combinations thereof, and memory. The location determining element 140 may be in electronic communication with the first antenna 120, although, in some embodiments, the location determining element 140 may be in electronic communication with the second antenna 144. The first antenna 120 (or the second antenna 144) may wirelessly receive a first electronic signal from one or more of the previously-mentioned satellite systems and provide the first electronic signal to the location determining element 140. The location determining element 140 may process the first electronic signal, which includes data and information, from which geographic information such as the current geolocation is determined. The current geolocation may include geographic coordinates, such as the latitude and longitude, of the current geographic location of the wrist-worn electronic device 100. The location determining element 140 may communicate the current geolocation to the processing element 132.

Although embodiments of the location determining element 140 may include a satellite navigation receiver, it will be appreciated that other location-determining technology may be used. For example, cellular towers or any customized transmitting radio frequency towers can be used instead of satellites may be used to determine the location of the wrist-worn electronic device 100 by receiving data from at least three transmitting locations and then performing basic triangulation calculations to determine the relative position of the device with respect to the transmitting locations. With such a configuration, any standard geometric triangulation algorithm can be used to determine the location of the electronic device. The location determining element 140 may also include or be coupled with a pedometer, accelerometer, compass, or other dead-reckoning components which allow it to determine the location of the wrist-worn electronic device 100. The location determining element 140 may determine the current geographic location through a communications network, such as by using Assisted GPS (A-GPS), or from another electronic device. The location determining element 140 may even receive location data directly from a user. In these alternative embodiments, the location determining element 140 may also be in electronic communication with the first antenna 120.

The communication element 142 generally enables communication between wrist-worn electronic device 100 and external systems or devices. The communication element 142 may include signal or data transmitting and receiving circuits, such as amplifiers, filters, mixers, oscillators, digital signal processors (DSPs), and the like. Various combinations of these circuits may form a transceiver, which transmits, receives, and processes signals such as the ones listed in the following discussion. The communication element 142 may establish communication wirelessly by utilizing radio frequency (RF) signals and/or data that comply with communication standards such as cellular 2G, 3G, 4G, or 5G, Institute of Electrical and Electronics Engineers (IEEE) 802.11 standards such as Wi-Fi, IEEE 802.16 standard such as WiMAX, Bluetooth™, or combinations thereof. In addition, the communication element 142 may utilize communication standards such as ANT, ANT+, Bluetooth™ low energy (BLE), the industrial, scientific, and medical (ISM) band at 2.4 gigahertz (GHz), or the like. The communication element 142 may be in communication with the processing element 132 and the memory element 134. In various embodiments, the wrist-worn electronic device 100 may be configured to establish communication with more than one protocol or standard, and the communication element 142 may include a transceiver for each protocol or standard, such as Bluetooth™, Wi-Fi, cellular, etc., with which the wrist-worn electronic device 100 can communicate. Thus, the communication element 142 may be in electronic communication with the second antenna 144. The second antenna 144 may wirelessly transmit and receive electronic signals to and from exercise-related sensors, such as a heart rate monitor, a foot pod, a bike speed and cadence sensor, or the like, other electronic devices, such as a smartphone, a tablet, a laptop, or a desktop computer, or communication network interfaces such as a Wi-Fi router or a cell tower. The second antenna 144 may also wirelessly transmit and receive electronic signals, derived from the electronic signals, to and from the communication element 142.

The printed circuit board 118 may include electronic signal terminals and one or more electronic components that process electronic signals. The electronic signal terminals are each operable to provide a signal feed (F) to the one or more electronic components, such as the location determining element 140 and/or the communication element 142.

In embodiments, the electronic signal terminals may be the located on the printed circuit board 118 and an electrically conductive element (e.g., pin, wire, cable, etc.) may electrically contact the bezel 110 directly or indirectly via a conductive post 150. As such, in embodiments, the printed circuit board 118 may include at least two electronic signal terminals that are each electrically coupled with a coaxial cable that contacts two electronic signal terminals electrically coupled with two conductive posts 150.

The printed circuit board 118 may provide a ground plane for one or more antennas, including the first antenna 120, the second antenna 144, or both. The printed circuit board 118 includes one or more electrical ground terminals operable to provide an electrical ground point for the lower housing 106, the electrical ground locations 126, 128 on the upper surface 107 of the first portion 202 of the molded cover 200, and any electrically conductive contacts to be electrically grounded. The printed circuit board 118 may be positioned above the bottom wall 116 of the lower housing 106. For example, the printed circuit board 118 may be positioned above a battery positioned within the internal cavity 121 of the wrist-worn electronic device 100 such that the printed circuit board 118 is not proximate to the bottom wall 116. Thus, in embodiments, the printed circuit board 118 may be electrically coupled to the lower housing 106 and thereby extend the ground plane to the electrically conductive portions of the lower housing 106.

Each electrical connection between the electrical ground locations 122, 124 on a lower surface of the bezel 110 and the electrical ground locations 126, 128 on an upper surface 107 of the first portion 202 of the molded cover 200 may be formed by a conductive contact 158, 160. In some embodiments, the conductive contact 158, 160 may include compressible spring contacts or, alternatively, a conductive post. In alternative embodiments, the conductive contacts 158, 160 may include pogo pins, electrically conductive wires, electrically conductive cables, flexible printed circuits, and so forth.

In some embodiments, compressible spring contacts may each include a compressible portion (at the top) and a rigid portion that wraps around an inner surface of the spacer 108. The compressible portion of each compressible spring contact may rest within or pass through a conductive area. Compressible spring contacts may each be formed from electrically conductive material, such as metal, and may have a generally elongated, flat shape. In addition, each compressible spring contact may include a first leaf spring within a top half of each compressible spring contact and may be configured to make electrical contact with the lower surface of bezel 110 and a second leaf spring within a bottom half of each compressible spring contact and may be configured to make electrical contact with an electrical ground terminal positioned on the top surface 107 of the first portion 202 of the molded cover 200. Each compressible spring contact may be retained against an inner surface of the spacer 108 or pass through the conductive area within the spacer 108.

Thus, the conductive contact 158, 160 may form each of the electrical connections between the electrical ground locations 122, 145 of the lower surface of bezel 110 and the electrical ground locations 126, 128. In other embodiments, a conductive wire may provide the electrical connection between the bezel 110 and an electrical terminal on the printed circuit board 118. In such embodiments, a separate conductive contact may electrically couple electrical ground locations 122, 124 on a lower surface of the bezel 110 with electrical ground locations 126, 128, respectively, on the upper surface 107 of the first portion 202 of the molded cover 200.

The wrist-worn electronic device 100 may include a plurality of electrical ground locations 126, 128 on the upper surface 107 of the first portion 202 of the molded cover 200. The two electrical ground locations 126, 128 on the top surface 107 of the first portion 202 of the molded cover 200 associated with the first antenna 120 may form a first pair of electrical ground locations. Similarly, additional electrical ground locations on the top surface 107 of the first portion 202 of the molded cover 200 associated with the second antenna 144 may form a second pair of electrical ground locations.

Figure 3:
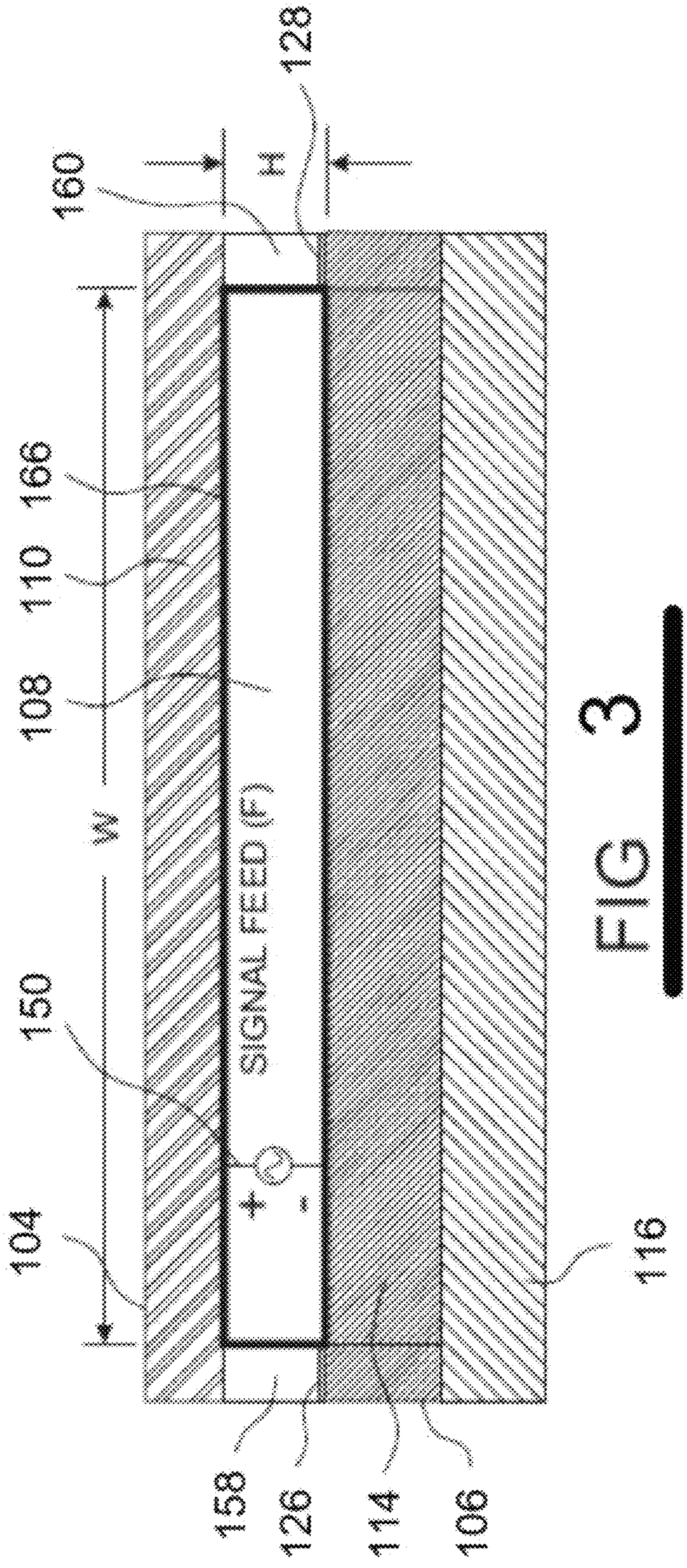
FIG. 3 is a diagrammatic, simplified, side view of the internal components of the wrist-worn electronic device of FIG. 1A, further illustrating an example of the upper housing, the lower housing, and the slot antenna according to some embodiments of the present disclosure.
Figure 4:
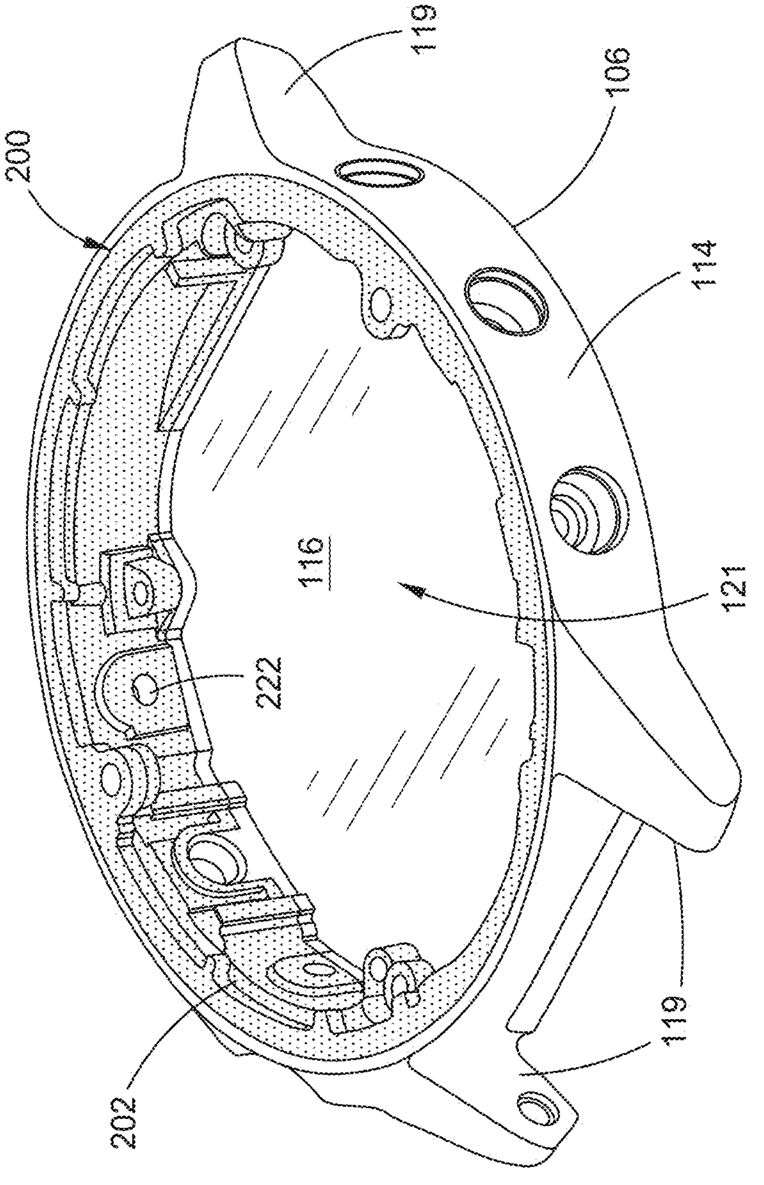
FIG. 4 is a perspective view of a molded cover applied to an inner surface of a lower housing of a housing assembly of a wrist-worn electronic device according to some embodiments of the present disclosure.

FIG. 3 illustrates a simplified side view of the internal components of the wrist-worn electronic device 100. As shown, the first antenna 120 is formed by the non-conductive slot 166, having a width (W) and a height (H), between the top surface 107 of the first portion 202 of the molded cover 200, a lower surface of the bezel 110, the conductive contacts 158, 160 (e.g., compressible spring contacts), that extends along the bezel 110 and the sidewall 114 associated with the first antenna 120 (that is, the portion of the bezel 110 identified in FIG. 1 between the electrical ground locations 122, 124). In the depicted example, the conductive post 150 may electrically couple with a first portion of a circumference of the bezel 110 between conductive contacts 158, 160, and the conductive post 150 (or a conductive spring contact) may provide a signal feed (F) to the first antenna 120. Typically, the signal feed (F) is electrically connected to a lower surface of the bezel 110 at a point away from a midpoint of the first portion of the circumference of the bezel 110 associated with the first antenna 120 (i.e., the signal feed (F) connection point on the lower surface of bezel 110 may be closer to one of the electrical ground locations 126, 128).

The conductive post 150 physically contacts and is electrically coupled with an electrical signal feed (F) location on the lower surface of the bezel 110. In some embodiments, the conductive post 150 is physically and electrically coupled with the electronic signal terminals and the bezel 110. Thus, the conductive post 150 may be an electrical signal contact because an electrical signal feed (F) location on the bezel 110 is electrically coupled with, and provides a signal feed (F) to, the one or more electronic components, such as the location determining element 140 or the communication element 142, on the printed circuit board 118.

The portion of bezel 110 along a circumference of the bezel 110 between the electrical ground locations 122, 124 associated with the first antenna 120 form a first portion of the bezel 110. The first portion of the bezel 110 may be the shorter circumference of the bezel 110 between the electrical ground locations 122,124 and associated with the first antenna 120 or the longer circumference of the bezel 110 between the electrical ground locations 122, 124. In embodiments, the performance of the first antenna 120 may be improved by electrically grounding the portion of bezel 110 along a circumference of the bezel 110 that is not associated with the first antenna 120 or the second antenna 144.

In some embodiments, the second antenna 144 may be configured to utilize the slot-antenna configuration. The first antenna 120 and/or the second antenna 144 may be configured to transmit and receive a second wireless signal, such as Bluetooth™, Wi-Fi, cellular, etc., and may wirelessly transmit and receive a corresponding second electronic signal. The second antenna 144 may be formed from a second portion of the circumference of the bezel 110. The length of the second portion of the circumference of the bezel 110 associated with the second antenna 144 may be based on a wavelength or frequency (wavelength=c (speed of light)/frequency) of the second electronic signal, which may have a different wavelength (or frequency) in comparison to the first electronic signal. For example, the length of the second portion of the circumference of the bezel 110 associated with the second antenna 144 may be one-half (or one-fourth) of a wavelength of the second electronic signal, which may have a frequency that is twice (double) the frequency of the first electronic signal.

In other embodiments, the first antenna 120 and the second antenna 144 may share the one or more electrical ground locations 126, 128 on the upper surface 107 of the first portion 202 of the molded cover 200. For example, one of electrical ground locations 126, 128 associated with the first antenna 120 may be electrically connected to the second antenna 144 such that the electrical ground location 126 or electrical ground location 128 is also associated with the second antenna 144.

The printed circuit board 118 generally provides a substrate for supplying electric power to, and electronic communication between, the electronic components in the internal cavity 121, such as the location determining element 140, the communication element 142, the memory element 134, and the processing element 132. The printed circuit board 118 may be of generally known construction with a first, or top, side and an opposing second, or bottom, side. The printed circuit board 118 may also include multiple electrically conductive layers with a top conductive layer placed on the first side, a bottom conductive layer placed on the second side, one or more inner conductive layers positioned between the first and second sides, and an insulating layer between each pair of adjacent conductive layers. The insulating layers may be formed from rigidized material that includes various combinations of fiberglass, woven glass, matte glass, cotton paper, phenolic cotton paper, polyester, epoxies, epoxy resins, and the like. Each conductive layer may include one or more conductive electronic signal or electrical power or ground traces, one or more signal, power, or ground pads, full or partial power planes, or full or partial ground planes. The conductive layers may be formed from metals typically including copper, but also including nickel, aluminum, gold, silver, palladium, zinc, tin, lead, and the like. In addition, the printed circuit board 118 may include plated through hole vias, blind vias, buried vias, and the like. The electronic components may be implemented in packages which are mounted on the top side, the bottom side, or both sides. The electronic components may communicate with one another through electronic signal traces. Given that the printed circuit board 118 may be retained within internal cavity 121 of the wrist-worn electronic device 100, the printed circuit board 118 may have an outline shape and perimeter that is generally similar to the shape of the interior of the lower housing 106. In exemplary embodiments, the lower housing 106 is generally circular, and thus, the outline shape of the printed circuit board 118 may be circular, hexagonal or octagonal to approximate the circular shape. Other outline shapes of the printed circuit board 118 are possible including square, rectangular, or even circular. In embodiments, printed circuit board 118 may have an irregular shape such that it is partially circular and partially rectangular.

As detailed herein, the first antenna 120 generally converts wireless RF electromagnetic radiation (an electronic signal) into a corresponding electronic signal. The non-conductive slot 166 through which the electric field of the first antenna 120 passes includes a portion of the spacer 108. A signal transmitted using the first antenna 120 having a non-conductive slot within the spacer 108 is output (electromagnetically radiates) to the side of the housing assembly 102 in the far field (based on constructive and destructive interference). Similarly, the first antenna 120 may receive a signal output from that direction in the far field or from any other direction.

In some embodiments, the first antenna 120 is in electronic communication with the location determining element 140, such that it is configured to wirelessly receive a GPS signal from GPS satellites. In other embodiments, the first antenna 120 may be configured to wirelessly transmit and receive communication signals to communicate wirelessly with other electronic devices, systems, or networks using communication protocols such as Bluetooth™, Wi-Fi™, or cellular signals.

In embodiments, the non-conductive slot 166 (FIG. 3) may be formed by a portion of the spacer 108. For example, the non-conductive slot 166 may be formed by a portion of the spacer 108 defined or enclosed by a portion of the bezel 110 between conductive contacts 158, 160 (each providing an electrical connection to an electrical ground location), an upper surface 107 of the first portion 202 of the molded cover 200 along a perimeter of the lower housing 106 between the conductive contacts 158, 160. Furthermore, the conductive post 150 (or an electrically conductive spring contact) may provide an electrical connection to an electrical signal feed (F).

The second antenna 144 (also a slot antenna) may be substantially similar to the first antenna 120 in function and structure such that it may utilize a slot antenna configuration having a non-conductive slot. For instance, the second antenna 144 may utilize a portion of the upper housing 104 and the lower housing 106 that are not being utilized by or partially overlapping with the first antenna 120. Similar to the first antenna 120, the second antenna 144 may be configured as a slot antenna including a non-conductive slot formed by a portion of the spacer 108, an air gap, or a combination thereof. The non-conductive slot may have any three-dimensional shape such as a substantially rectangle, a square, an oval, or a circle shape formed in a portion of the upper housing 104 and the lower housing 106.

The lower portion of the second antenna 144 is formed by a second portion of a circumference of first portion 202 of the molded cover 200 extending between conductive contacts such that the lower portion of the second antenna 144 corresponds to upper portion of the second antenna 144.

The conductive post 150 of the second antenna 144 may be electrically coupled with an electrical signal feed (F) location in electrical communication with the communication element 142, such that the second antenna 144 may wirelessly transmit and receive electronic signals to and from other electronic devices, systems, or networks using communication protocols such as Bluetooth™, Wi-Fi™, or cellular signals. As with the first antenna 120, the length of the second portion of the bezel 110 circumference may be based on a half wavelength of the signal that the second antenna 144 is configured to transmit and receive. The half wavelength of the second electronic signal may be different than the half wavelength of the first electronic signal, which is transmitted or received by first antenna 120.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. A wrist-worn electronic device comprising:

a lower housing including a molded cover and an outer portion, the molded cover including a first portion composed of an electrically conductive material, a second portion composed of an electrically non-conductive material and a surface having a first electrical ground location and a second electrical ground location;

an upper housing opposing the molded cover of the lower housing, the upper housing including a bezel formed of an electrically conductive material, the bezel having a lower surface corresponding to an upper surface of the molded cover and a third electrical ground location and a fourth electrical ground location that are each electrically coupled with the first electrical ground location and the second electrical ground location on the surface of the molded cover, respectively;

an electrically non-conductive element positioned between the lower surface of the bezel and the upper surface of the molded cover;

a first antenna configured to wirelessly receive a first electronic signal, the first antenna formed by a first nonconductive slot formed between a first portion of the lower surface of the bezel along a circumference of the bezel between the third electrical ground location and the fourth electrical ground location, a first portion of the upper surface of the molded cover along a circumference of the molded cover corresponding to the first portion of the lower surface of the bezel, and two electrical ground contacts each electrically coupling the first electrical ground location and the second electrical ground location on the upper surface of the molded cover with the third electrical ground location and the fourth electrical ground location on the lower surface of the bezel, respectively, the height of the first nonconductive slot corresponding to a height of the electrically nonconductive element; and a location determining element electrically coupled with the first antenna, the location determining element configured to receive the first electronic signal from the first antenna and determine a current geolocation of the electronic device based on the first electronic signal;

wherein the second portion of the molded cover substantially electrically shields the first antenna from the outer portion of the lower housing.

2. The wrist-worn electronic device of claim 1, wherein the outer portion of the lower housing is composed of a non-homogenous material, and wherein the electrically non-conductive material composing the second portion of the molded cover is a composite.

3. The wrist-worn electronic device of claim 2, wherein the lower housing includes a bottom wall configured to contact a wearer's wrist and a side wall that encloses the molded cover, the side wall composed of the non-homogeneous material that composes the outer portion of the lower housing.

4. The wrist-worn electronic device of claim 2, wherein the non-homogenous material composing the outer portion of the lower housing and the side wall of the lower housing is carbon fiber.

5. The wrist-worn electronic device of claim 1, further comprising a printed circuit board positioned within an internal cavity at least partially defined by the lower housing, wherein the printed circuit board is electrically coupled to the lower housing, the combination of the printed circuit board and the side wall forming a ground plane for the first antenna.

6. The wrist-worn electronic device of claim 5, further comprising:

a first electrical signal contact electrically coupling the location determining element with the bezel at a position along the first portion of the circumference of the bezel between the third electrical ground location and the fourth electrical ground location.

7. The wrist-worn electronic device of claim 1, wherein the two electrical ground contacts are electrically conductive spring contacts, and wherein the first electrical signal contact is an electrically conductive post.

8. The wrist-worn electronic device of claim 1, wherein a length of the first portion of the circumference of the bezel associated with the first antenna is one-half of a wavelength of the first electronic signal.

9. The wrist-worn electronic device of claim 1, wherein the outer portion of the lower housing is composed of a homogenous material having a first electrical conductivity, the first electrical conductivity being less than a second electrical conductivity of the bezel, and wherein the electrically non-conductive material composing the lower portion of the molded cover is a composite.

10. The wrist-worn electronic device of claim 9, wherein the homogenous material composing the outer portion of the lower housing is titanium.

11. The wrist-worn electronic device of claim 1, wherein the lower housing includes lugs between which a strap is positioned to secure the wrist-worn electronic device to a user's wrist.

12. The wrist-worn electronic device of claim 1, wherein a surface of the molded cover is formed to include at least one protrusion, and wherein the outer portion of the lower housing includes a surface formed to include at least one recess that corresponds to and aligns with the protrusion of the molded cover, and wherein the electrically non-conductive material composing the second portion of the molded cover is a ceramic.

13. A wrist-worn electronic device comprising:

a lower housing including a molded cover and an outer portion, the molded cover including an upper portion composed of an electrically conductive material and a lower portion composed of an electrically non-conductive material, the upper portion having an upper surface having a first electrical ground location and a second electrical ground location;

an upper housing opposing the molded cover of the lower housing, the upper housing including a bezel formed of an electrically conductive material, the bezel having a lower surface corresponding to an upper surface of the molded cover and a third electrical ground location and a fourth electrical ground location electrically coupled with the first electrical ground location and the second electrical ground location on the upper surface of the molded cover, respectively;

an electrically non-conductive element positioned between the lower surface of the bezel and the upper surface of the molded cover;

a first antenna configured to wirelessly receive a first electronic signal, the first antenna formed by a first nonconductive slot formed between a first portion of the lower surface of the bezel along a circumference of the bezel between the third electrical ground location and the fourth electrical ground location, a first portion of the upper surface of the molded cover along a circumference of the molded cover corresponding to the first portion of the lower surface of the bezel, and two electrical ground contacts each electrically coupling the first electrical ground location and the second electrical ground location on the upper surface of the molded cover with the third electrical ground location and the fourth electrical ground location on the lower surface of the bezel, respectively, the height of the first nonconductive slot corresponding to a height of the electrically nonconductive element; and a location determining element electrically coupled with the first antenna, the location determining element configured to receive the first electronic signal from the first antenna and determine a current geolocation of the electronic device based on the first electronic signal;

wherein the lower portion of the molded cover is a composite and substantially electrically shields the first antenna from the outer portion of the lower housing; and wherein the lower housing includes a side wall that encloses the molded cover.

14. The wrist-worn electronic device of claim 13, wherein the outer portion and the side wall of the lower housing is composed of a non-homogenous material.

15. The wrist-worn electronic device of claim 14, wherein the non-homogenous material composing the outer portion of the lower housing and the side wall of the lower housing is carbon fiber.

16. The wrist-worn electronic device of claim 13, wherein the outer portion of the lower housing is composed of a homogenous material having a first electrical conductivity, the first electrical conductivity being less than a second electrical conductivity of the bezel.

17. The wrist-worn electronic device of claim 16, wherein the homogenous material composing the outer portion of the lower housing and the side wall of the lower housing is titanium.

18. A wrist-worn electronic device comprising:

a lower housing including a molded cover and an outer portion, the molded cover including an inner portion composed of an electrically conductive material and an outer portion composed of an electrically non-conductive material, the inner portion having an upper surface having a first electrical ground location and a second electrical ground location;

an upper housing opposing the molded cover of the lower housing, the upper housing including a bezel formed of an electrically conductive material, the bezel having a lower surface corresponding to an upper surface of the molded cover and a third electrical ground location and a fourth electrical ground location that are each electrically coupled with the first electrical ground location and the second electrical ground location on the upper surface of the molded cover, respectively;

an electrically non-conductive element positioned between the lower surface of the bezel and the upper surface of the molded cover;

a first antenna configured to wirelessly receive a first electronic signal, the first antenna formed by a first nonconductive slot formed between a first portion of the lower surface of the bezel along a circumference of the bezel between the third electrical ground location and the fourth electrical ground location, a first portion of the upper surface of the molded cover along a circumference of the molded cover corresponding to the first portion of the lower surface of the bezel, and two electrical ground contacts each electrically coupling the first electrical ground location and the second electrical ground location on the upper surface of the molded cover with the third electrical ground location and the fourth electrical ground location on the lower surface of the bezel, respectively, the height of the first nonconductive slot corresponding to a height of the electrically nonconductive element; and a location determining element electrically coupled with the first antenna, the location determining element configured to receive the first electronic signal from the first antenna and determine a current geolocation of the electronic device based on the first electronic signal;

wherein the outer portion of the molded cover is a composite and substantially electrically shields the first antenna from the outer portion of the lower housing; and wherein the lower housing includes a side wall that encloses the molded cover.

19. The wrist-worn electronic device of claim 18, wherein the outer portion and the side wall of the lower housing is composed of a non-homogenous material.

20. The wrist-worn electronic device of claim 18, wherein the outer portion of the lower housing is composed of a homogenous material having a first electrical conductivity, the first electrical conductivity being less than a second electrical conductivity of the bezel.

* * * * *